United States Patent
Komatsu et al.

(10) Patent No.: US 9,477,084 B2
(45) Date of Patent: Oct. 25, 2016

(54) VIRTUAL IMAGE DISPLAY APPARATUS INCLUDING A LIGHT GUIDE MEMBER HAVING FOUR OR MORE CURVED SURFACES

(71) Applicant: SEIKO EPSON CORPORATION, Tokyo (JP)

(72) Inventors: Akira Komatsu, Tatsuno-machi (JP); Takahiro Totani, Suwa (JP); Masayuki Takagi, Matsumoto (JP); Takashi Takeda, Suwa (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 99 days.

(21) Appl. No.: 14/528,410

(22) Filed: Oct. 30, 2014

(65) Prior Publication Data
US 2015/0153573 A1    Jun. 4, 2015

(30) Foreign Application Priority Data
Nov. 29, 2013  (JP) .................................. 2013-247388

(51) Int. Cl.
*G09G 5/00*   (2006.01)
*G02B 27/01*  (2006.01)

(52) U.S. Cl.
CPC ....... *G02B 27/017* (2013.01); *G02B 2027/011* (2013.01); *G02B 2027/0178* (2013.01)

(58) Field of Classification Search
None
See application file for complete search history.

(56) References Cited

U.S. PATENT DOCUMENTS

| 5,909,325 | A | 6/1999 | Kuba et al. | |
| 6,337,776 | B1* | 1/2002 | Kamo | G02B 13/0065 359/631 |
| 7,345,822 | B1 | 3/2008 | Yamazaki | |
| 2001/0048561 | A1* | 12/2001 | Heacock | G02B 27/0172 359/631 |
| 2010/0046070 | A1* | 2/2010 | Mukawa | G02B 27/0176 359/480 |
| 2010/0245211 | A1* | 9/2010 | Iba | G02B 17/006 345/8 |
| 2012/0086623 | A1* | 4/2012 | Takagi | G02B 6/0053 345/7 |
| 2012/0162549 | A1* | 6/2012 | Gao | G02B 27/0172 349/11 |
| 2013/0182317 | A1* | 7/2013 | Takahashi | G02B 5/04 359/365 |

FOREIGN PATENT DOCUMENTS

| JP | H07-333551 A | 12/1995 |
| JP | H09-073043 A | 3/1997 |

(Continued)

*Primary Examiner* — Ilana Spar
*Assistant Examiner* — Kirk Hermann
(74) *Attorney, Agent, or Firm* — Oliff PLC

(57) ABSTRACT

A light guide member includes four or more curved surfaces including three or more non-axisymmetric curved surfaces so that video light emitted from a video element and passing through the light guide member is displayed to an observer on a divergent optical path in an enlarged manner. Reflection of the video light is made four times by four surfaces different from one another in the inside of the light guide member, such that at least total reflection is performed on a third surface as a second reflection among the four times of reflections, total reflection is performed on a first surface as a third reflection, reflection is performed on a second surface as the fourth reflection, and the video light reaches the eyes of the observer by being transmitted through the first surface.

20 Claims, 23 Drawing Sheets

(56) References Cited

FOREIGN PATENT DOCUMENTS

| JP | H09-197336 A | 7/1997 |
|---|---|---|
| JP | 2911750 B2 | 6/1999 |
| JP | 2002-090690 A | 3/2002 |
| JP | 2004-341324 A | 12/2004 |
| JP | 2005-017775 A | 1/2005 |
| JP | 4069814 B2 | 4/2008 |

* cited by examiner

VIRTUAL IMAGE DISPLAY APPARATUS INCLUDING A LIGHT GUIDE MEMBER HAVING FOUR OR MORE CURVED SURFACES

BACKGROUND

1. Technical Field

The present invention relates to a virtual image display apparatus which provides video formed by an image display element or the like to an observer, and in particular, to a virtual image display apparatus which is suitable for a head-mounted display worn by the head of the observer.

2. Related Art

Various optical systems have been proposed as an optical system which is assembled in a virtual image display apparatus, such as a head-mounted display (hereinafter, also referred to as an HMD) worn by the head of an observer (see JP-A-9-197336, JP-A-9-73043, Japanese Patent No. 4069814, JP-A-2002-90690, and JP-A-2004-341324).

For the virtual image display apparatus, such as an HMD, it is desirable to enlarge a viewing angle of video light and to reduce the weight of the apparatus. In particular, in order to improve the fit, it is important to reduce the thickness in a visual axis direction of the observer and to bring the center of gravity close to the observer.

Since it is advantageous that an optical path is bent using a reflection surface for miniaturizing an optical system and reducing the weight thereof, various optical systems using a prism have been developed. At this time, it is important to use a reflection surface or a refractive surface as a non-axisymmetric curved surface and to effectively perform aberration correction by applying the degree of freedom of the shape thereof.

For example, in JP-A-9-197336 and JP-A-9-73043, an optical system in which reflection is performed four times on the inside of a prism is disclosed. This type of optical system has an extremely simple configuration and is advantageous for weight reduction, but reflection is made two times on a surface closest to eyes of an observer so that the degree of freedom of the shape is small and optical performance is insufficient.

In Japanese Patent No. 4069814, an optical system in which reflection is made four times in the inside of a prism is disclosed, but the first, second, third, and fourth reflections are respectively made on the same reflection surface so that the degree of freedom of a non-axisymmetric surface is not utilized and aberration correction is insufficient.

Further, in JP-A-2002-90690 and JP-A-2004-341324, an optical system in which reflection is made four times in the inside of a prism is disclosed, but a relay optical system cooperatively forming an intermediate image is formed. Therefore, an entire optical path is long and a thick prism is necessary to be used so that the weight thereof is increased.

In addition, in a case of an optical system of forming an intermediate image, it is possible to generate an image with a wide visual angle even when an element allowing an image of a video element or the like to be generated is arranged in a position separated to some extent from the position of eyes of an observer. However, it is likely that the optical design becomes complicated, and dust, bubbles, and the like are present in the vicinity of an intermediate image, or when discoloration or the like is locally generated in an optical member due to deterioration with time, there is a possibility that these become enlarged and the display quality is deteriorated.

SUMMARY

An advantage of some aspects of the invention is to provide a virtual image display apparatus which has a wide visual angle and high performance and is small in size and light in weight.

An aspect of the invention is directed to a virtual image display apparatus including a video element which generates video light; and a light guide member which includes four or more curved surfaces including three or more non-axisymmetric curved surfaces, in which the video light emitted from the video element and passing through the light guide member is displayed to an observer on a divergent optical path in an enlarged manner, and the light guide member includes at least three surfaces of a first surface, a second surface, and a third surface as the four or more curved surfaces, reflection of the video light is made four times by four surfaces different from one another in the inside of the light guide member, total reflection is performed on the third surface as a second reflection among the four times of reflections, total reflection is performed on the first surface as a third reflection, reflection is performed on the second surface as the fourth reflection, and the video light reaches the eyes of the observer by being transmitted through the first surface.

In the virtual image display apparatus, the light guide member includes four or more curved surfaces having three or more non-axisymmetric curved surfaces, and sufficient aberration correction becomes possible and video having a wide visual angle and high performance may be displayed by allowing the video light from the video element to be reflected on the four or more curved surfaces different from one another or to be transmitted therethrough. Further, in the inside of the light guide member, when reflection of the video light is made four times in total, the length of the optical path can be sufficiently ensured even in a case where the optical path is folded and an optical system is small so that the size and the weight of the entire apparatus can be reduced.

In a specific aspect of the invention, video light emitted from the video element is incident on the third surface, reflected on the fourth surface, and totally reflected on the third surface. In this case, since the light guide member has four curved surfaces and the third surface has functions of reflection and transmission of the video light, an optical system having a small size can be realized.

In another aspect of the invention, video light emitted from the video element is incident on a fifth surface, reflected on the fourth surface, and totally reflected on the third surface. In this case, since the light guide member has five curved surfaces and the degree of freedom of the shape of the curved surface is high, aberration is effectively corrected so that an optical system with high performance is realized.

In still another aspect of the invention, the following condition (1) is satisfied with a coefficient of a term $x^m \cdot y^n$ of a polynomial expression representing a k-th surface as $Ak_{m,n}$, when an expression of a surface shape z is expanded as a polynomial with respect to x and y, by setting origins of respective surfaces constituting the light guide member as references, employing orthogonal coordinates x and y extending in a tangential direction, and setting y as a direction orthogonal to a predetermined symmetric plane.

$$-2\times10^{-1}<A1_{0,2}+A1_{2,0}<-10^{-3},$$

$$-2\times10^{-1}<A2_{0,2}+A2_{2,0}<-10^{-3}, \text{ and}$$

$$-2\times10^{-1}<A3_{0,2}+A3_{2,0}<-10^{-3} \quad (1)$$

In this case, by setting three or more surfaces among surfaces constituting the light guide member as non-axisymmetric curved surfaces such as free-form curved surfaces or the like, aberration can be sufficiently corrected and an optical system with high image quality can be obtained. At this time, since the curvature of a curved surface basically characterizes the functions of the curved surface and the curvature in the vicinity of the origin is mainly determined by values of coefficients $Ak_{2,0}$ and $Ak_{0,2}$ (k=1 to 3), it is important to appropriately set the values of coefficients $Ak_{2,0}$ and $Ak_{0,2}$.

The condition (1) defines the magnitude of the curvature of the first surface, the second surface, and the third surface in the vicinity of the origin. When the value exceeds the upper limit of the condition (1), the surface shape becomes approximately planar and aberration correction becomes difficult. Further, when the value is lower than the lower limit of the condition (1), the curvature becomes extremely strong, the aberration correction becomes difficult, and the position of the light guide member becomes closer to the face of an observer so that wearing comfort is impaired. By satisfying the condition (1), the aberration can be sufficiently corrected and the light guide member can be shaped along the circumference of eyes.

In yet another aspect of the invention, the following condition (2) is satisfied with respect to the coefficient $Ak_{m,n}$ of the polynomial expression.

$$10^{-3}<|A1_{2,0}-A1_{0,2}|<10^{-1}, \text{ and}$$

$$10^{-3}<|A3_{2,0}-A3_{0,2}|<10^{-1} \quad (2)$$

The condition (2) defines a difference between the curvature of the first and third surfaces in the x-axis direction and the curvature of the first and third surfaces in the y-axis direction. When the value exceeds the upper limit of the condition (2), astigmatism generated in the first and third surfaces is increased so that aberration correction becomes difficult. When the value is lower than the lower limit of the condition (2), astigmatism generated in the inclined surface of the second surface or the like may not be corrected so that the image quality becomes degraded. By satisfying the condition (2), it is possible to compensate for aberration, which is generated in the second surface, in the first and third surfaces.

In still yet another aspect of the invention, the following condition (3) is satisfied with respect to the coefficient $Ak_{m,n}$ of the polynomial expression.

$$-10^{-1}<A1_{0,2}<A1_{2,0}<0, \text{ and}$$

$$-10^{-1}<A3_{0,2}<A3_{2,0}<0 \quad (3)$$

The condition (3) defines the magnitude of the curvature of the first and third surfaces in the x-axis direction and the curvature of the first and third surfaces in the y-axis direction. Specifically, the values of respective coefficients are both negative and the lower limit is provided so that the coefficient in the x-axis direction is closer to 0, that is, the absolute value is small in both the first and third surfaces. In the second surface among respective surfaces of the light guide member, since light from an angled direction is incident and refractive power tends to be large, the aberration is likely to be large. In contrast, by satisfying the condition (3) with regard to the first and third surfaces, it is possible to sufficiently correct aberration as the entire optical system.

In further another aspect of the invention, the entire optical system including the video element and the light guide member has a shape of plane-symmetry with respect to the predetermined symmetric plane, and a long side of the video element is arranged so as to be orthogonal to the symmetric plane. In this case, the predetermined symmetric plane means a plane such as a reference surface in the optical system of the light guide member or the like and the shape of plane-symmetry with respect to the symmetric plane means that a portion having a substantially optical function in the entire optical system has a shape of plane-symmetry with respect to the reference surface. In general, when reduction in size and weight is strongly demanded, the size of a display screen is limited, and the amount of information which can be displayed is also limited in accordance with the limitation of the size thereof. For example, in the above-described light guide member, it is necessary to increase the size of the apparatus, for example, by thickening the light guide member, for increasing a display range in a direction parallel to the symmetric plane in regard to a virtual image to be visually recognized. In contrast, by allowing the long side of the video element to be orthogonal to the symmetric plane, that is, by arranging the long side thereof such that the width of the video element in the direction along the symmetric plane becomes thin, it is possible to maintain the light guide member to be thin according to the demand for reduction in size and to display various pieces of information.

In still further another aspect of the invention, the virtual image display apparatus further includes a transmission optical element which is provided with the light guide member, includes at least one aspheric surface, and guides the video light. In this case, it is possible to correct aberration more excellently by the transmission optical element.

In yet further another aspect of the invention, the transmission optical element further includes a protection member which is arranged on the light emitting side of the light guide member and protect the video element and the light guide member in a sealing state in cooperation with the transmission optical element. In this case, it is possible to protect the light guide member and the video element without exposing the same and to reduce damage or the like due to an impact, by using the transmission optical element and the protection member.

In still yet further another aspect of the invention, a half mirror is formed on the second surface, video light is presented to the observer, a light transmission member is integrally arranged on the outside of the second surface, a diopter to external light is set to substantially 0, and external light and video light is presented to the observer in an overlapping manner. In this case, it is possible to reduce defocus and distortion of the external light observed through the second surface.

In a further aspect of the invention, the optical system including the light guide member covers a part in front of the eyes of the observer when worn, and a portion where the front of the eyes is not covered is provided.

In a still further aspect of the invention, the video element includes a signal light forming portion which emits signal light modulated corresponding to an image, and a scanning optical system which scans the signal light incident from the signal light forming portion to emit signal light as scanning light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of a virtual image display apparatus according to the invention will be described in detail with reference to FIG. 1 and the like.

Figure 1:
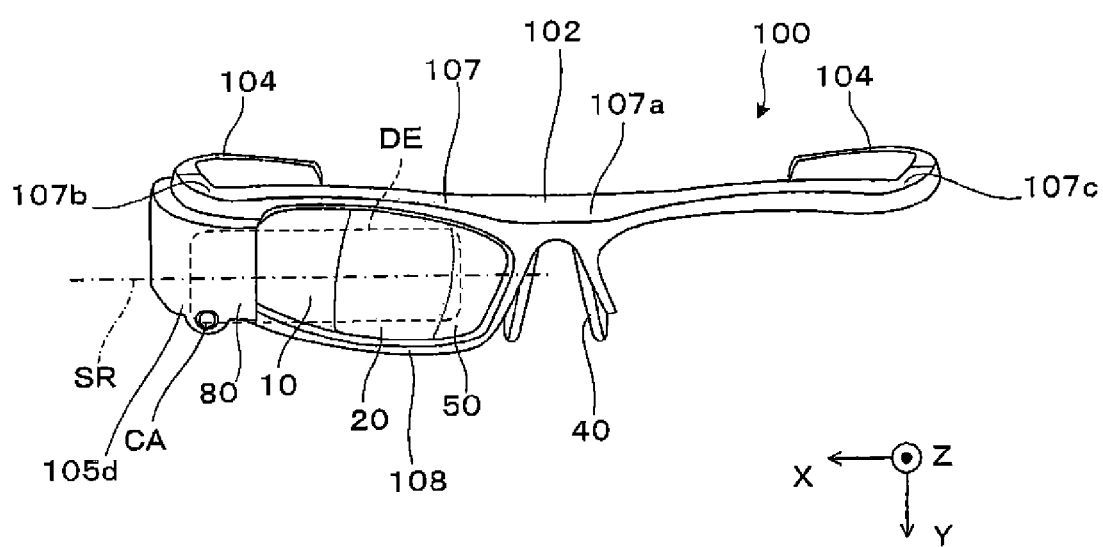
FIG. 1 is a front view illustrating a status of external appearance of a virtual image display apparatus according to an embodiment.

As illustrated in FIG. 1, a virtual image display apparatus 100 of the present embodiment is a head-mounted display having an external appearance of glasses, and includes as a pair an image display device 80 forming image light (video light) and a light guide device 20 guiding the video light emitted from the image display device 80 to be guided in front of eyes of an observer. It is possible for an observer or a user wearing the virtual image display apparatus 100 to visually recognize image light due to a virtual image and for the observer to visually recognize or observe an external image in a see-through manner. In the virtual image display apparatus 100, the image display device 80 and the light guide device 20 are generally provided to one of the right and the left eyes of the observer and a case where the image display device and the light guide device are provided in the right eye is described. In regard to the virtual image display device for the left eye, since the left and the right of the virtual image display apparatus for the right eye are merely reversed, illustration and description therefor are omitted. In addition, as a whole, the virtual image display apparatus 100 has an external appearance such that a small apparatus is attached to a frame of general glasses as illustrated in FIG. 1. Accordingly, the virtual image display apparatus 100 includes a frame part 102 which supports a light guide device 20 covering the front of eyes of the observer in a see-through manner, a temple part 104 extending from both left and right ends of the frame part 102 to the rear portion, and a cover-like exterior member 105d provided on a portion from both left and right ends of the frame part 102 to the temple part 104 and covering the image display device 80 or the like in addition to the image display device 80 and the light guide device 20. Further, the virtual image display apparatus 100 includes a small camera CA which is capable of imaging an image on a rear side portion thereof.

Hereinafter, the external appearance of the virtual image display apparatus 100 will be described. As illustrated in the figure, the frame part 102 provided in the virtual image display apparatus 100 includes a frame 107 arranged on the upper side and a protector 108 arranged on the lower side. In the frame part 102, the frame 107 on the upper side is a long and narrow plate-like member which is bent in a U shape within an XZ plane, and includes a front portion 107a which extends in a right-left horizontal direction (X direction), and a pair of side portions 107b and 107c which extend in a front-back depth direction (Z direction). The frame 107, that is, the front portion 107a and the side portions 107b and 107c are a metal integral component formed by aluminum die casting or formed of various metal materials. The width in the depth direction (Z direction) of the front portion 107a is sufficiently greater than the thickness or width of the light guide device 20. The protector 108 arranged on the lower side in the frame part 102 is an under rim-like member and is arranged and fixed below the frame 107. The protector 108 is a long and narrow plate-like member which is bent and is integrally formed with a metal material or a resin material.

The frame 107 supports the light guide device 20 and protects the image display device 80 accommodated in the inside of the light guide device 20 or a cover-like exterior member 105d in cooperation with the exterior member 105d covering a part of the light guide device 20 and the image display device 80. Further, the frame 107 and the protector 108 are separated from or are in loose contact with an elliptical peripheral portion of the light guide device 20. For this reason, even when there is a difference in a coefficient of thermal expansion between the central light guide device 20 and the frame part 102 including the frame 107 and the protector 108, expansion of the light guide device 20 inside the frame part 102 is permitted, whereby it is possible to prevent the occurrence of distortion, deformation, and damage of the light guide device 20.

A bridge part 40 is provided together with the frame 107. The bridge part 40 plays a part in coming into contact with the nose of the observer to support the frame part 102. That is, the frame part 102 is arranged in front of the face of the observer by the bridge part 40 supported by the nose and a pair of temple parts 104 supported by the ears. The bridge part 40 is fixed by screws to be sandwiched between the front portion 107a of the frame 107 which is an element constituting the frame part 102 and the central portion of the protector 108 which is another element constituting the frame part 102. In addition, the external appearance shown with reference to FIG. 1 as described above is merely an example, among mechanisms fixed by a screw, and for example, in regard to a part which is not directly involved as an optical mechanism, the design thereof can be appropriately changed.

Figure 2:
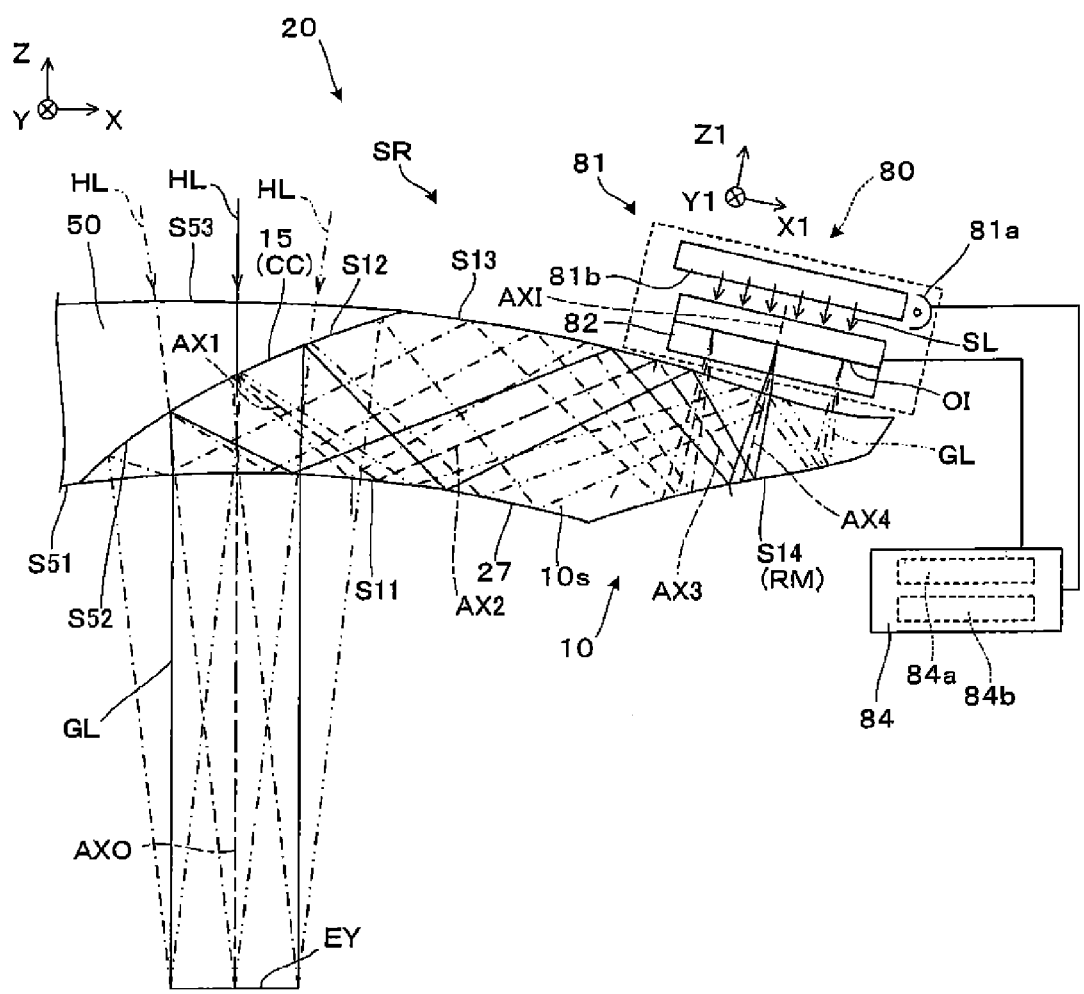
FIG. 2 is a cross-sectional view of a main body portion constituting the virtual image display apparatus when seen in a plan view.

Hereinafter, details such as functions and operations of the image display device 80 and the light guide device 20 will be described with reference to FIG. 2. In addition, FIG. 2 illustrates a cross section of a reference surface SR including an optical axis AX of the optical system in the virtual image display apparatus 100.

The image display device 80 includes an illumination device 81 which emits illumination light, a video display element 82 which is a transmissive spatial light modulation device, and a drive control unit 84 which controls the operation of the illumination device 81 and the video display element 82.

The illumination device 81 of the image display device 80 includes a light source 81a which generates light including three colors of red, green, and blue, and a backlight guide part 81b which diffuses light from the light source to convert light to a light flux having a rectangular cross-section. In addition, in the present specification, the light flux means collection of light beams (light beams flux). The video display element (video element) 82 is formed of, for example, a liquid crystal display device, configured of a plurality of pixels, and spatially modulates illumination light from the illumination device 81 to form image light to be displayed, such as a motion image. The drive control unit 84 includes a light source drive circuit 84a and a liquid crystal drive circuit 84b. The light source drive circuit 84a supplies power to the illumination device 81 to emit illumination light with stable luminance. The liquid crystal drive circuit 84b outputs an image signal or a drive signal to the video display element (video element) 82, thereby forming color video light or image light to be a source of a motion image or a still image as a transmittance pattern. Although an image processing function can be provided in the liquid crystal drive circuit 84b, the image processing function may be provided in an external control circuit. The image display device 80 emits video light GL to which illumination light SL is spatially modulated toward the light incident surface of the light guide device 20. Further, a projection optical axis (emission optical axis) in the image display device 80 is set as an incident-side optical axis AXI with respect to the light guide device 20.

The light guide device 20 is a prism-type member which emits the video light GL emitted from the image display device 80 toward the eyes EY of the observer, and includes a light guide member 10 for light guidance and a see-through function and a light transmission member 50 for the see-through function. The light guide member 10 which is a part of the light guide device 20 is an arc-like member bent to follow the face in a plan view. The light guide member 10 is a member guiding the video light GL incident on the inside of the light guide device 20 from the image display device 80 and includes a first surface S11, a second surface S12, a third surface S13, and a fourth surface S14 as main surfaces contributing to optical functions in guiding light, that is, guiding light like reflection or transmission of the video light GL. Among these, the first surface S11 and the fourth surface S14 are continuously adjacent to each other. Further, the second surface S12 is arranged between the first surface S11 and the third surface S13.

Hereinafter, respective surfaces constituting the light guide member 10 will be described in detail. In the light guide member 10, the first surface S11 is a free-form curved surface using an emission-side optical axis AXO parallel to a z-axis as a central axis, the second axis S12 is a free-form curved surface using an optical axis AX1 included in the reference surface SR (the cross section in the figure) parallel to an XZ surface and inclined to the Z-axis as a central axis, and the third surface S13 is a free-form curved surface using an optical axis parallel to a bisector of a pair of optical axes AX2 and AX3 included in the reference surface SR parallel to the XZ surface and inclined to the Z-axis as a local z-axis. The fourth surface S14 is a free-form curved surface using an optical axis parallel to a bisector of a pair of optical axes AX3 and AX4 included in the reference surface SR parallel to the XZ surface and inclined to the Z-axis as a local z-axis. The incident-side optical axis AXI is arranged on the extended area of the fourth surface S14 side of the optical axis AX4. Further, the above-described first to fourth surfaces S11 to S14 have a shape of plane-symmetry in the orthogonal (longitudinal) Y-axis direction by sandwiching the reference surface SR which horizontally (laterally) extends and is parallel to the XZ surface, and through which the optical axes AX1 to AX4 pass. In addition, the expression "the light guide member 10 or the like has a shape of plane-symmetry with respect to the reference surface SR" means that a portion having an optical function in the light guide member 10 or the like is plane-symmetric using the reference surface SR as a plane of symmetry. For example, in a case where an area DE illustrated in FIG. 1 indicates the range of a portion having an optical function of the light guide member 10 or the image display device 80, the shape in the range indicated by the local area DE between the light guide member 10 or the image display device 80 is plane-symmetric with respect to the reference surface SR in the Y-axis direction. That is, the light guide member 10 is a plane of symmetry in regard to a portion in which the reference surface SR has an optical function of the entire optical system.

In the light guide member 10, a main body 10s is formed of a resin material having a high light transmission property in a visible region, and is molded by injecting and solidifying thermoplastic resin inside a mold. As the material of the main body 10s, for example, cycloolefin polymer or the like may be used. The main body 10s may be an integrated product, as described above. The light guide member 10 enables light guidance and emission of video light GL and enables the see-through function of external light HL.

In the light guide member 10, the first surface S11 functions as a refraction surface which emits video light GL outside the light guide member 10 and functions as a total reflection surface which totally reflects video light GL on the inner surface side. The first surface S11 is arranged in front of the eyes EY, and is formed to have a concave surface shape with respect to the observer. The first surface S11 is a surface which is formed of a hard coat layer 27 on the surface of the main body 10s.

The second surface S12 is the surface of the main body 10s, and a half mirror layer 15 is attached thereto. The half mirror layer 15 is a reflection film (that is, transflective film) having a light transmission property. The half mirror layer (transflective film) 15 is formed on a narrowed partial area (not illustrated) of the second surface S12 in terms of the vertical direction along the Y-axis and the lateral direction along the X-axis direction instead of the entire second surface S12. The half mirror layer 15 is formed by forming a metal reflection film or a dielectric multilayer film on the partial area of the underlayer surface of the main body 10s. The reflectance of the half mirror layer 15 to video light GL is set to the range of 10% to 50% in an assumed incidence angle range of video light GL from the viewpoint of facilitating the observation of external light HL in a see-through manner. Specifically, the reflectance of the half mirror layer 15 to video light GL in a specific example is set to, for example, 20%, and the transmittance of the half mirror layer 15 to video light GL is set to, for example, 80%.

The third surface S13 functions as a total reflection surface which totally reflects video light GL on the inner surface side. Further, the third surface S13 functions as a refractive surface which allows the video light GL to be incident on the light guide member 10. That is, the third surface S13 has functions of a light incidence surface which allows the video light GL to be incident on the light guide member 10 from the external portion and of a reflection surface which allows the video light GL to propagate through the inside of the light guide member 10. The third surface S13 is arranged in front of the eyes EY, and, similarly to the first surface S11, has a concave surface shape with respect to the observer. When external light HL passing through the first surface S11 and the third surface S13 is viewed, a diopter is substantially 0. In addition, the third surface S13 is a surface which is formed of the hard coat layer 27 on the surface of the main body 10s.

The fourth surface S14 is formed by forming a light reflection film RM formed of an inorganic material on the surface of the main body 10s and functions as a reflection surface.

As described above, according to the present embodiment, in the inside of the light guide member 10, video light from the video display element 82 is guided by four times of reflection from the first surface S11 to the fourth surface S14 including at least two times of total reflection. In addition, respective surfaces from the first surface S11 to the fourth surface S14 are all free-form curved surfaces. Accordingly, display of video light GL and a see-through function which allows the external light HL to be visually recognized are both established and the aberration of the video light GL can be corrected.

The light transmission member 50 is fixed integrally with the light guide member 10 and is constituted as a single light guide device 20. The light transmission member 50 is a member (auxiliary optical block) which assists a see-through function of the light guide member 10, and has a first transmission surface S51, a second transmission surface S52, and a third transmission surface S53 as a lateral surface having an optical function. Here, the second transmission surface S52 is arranged between the first transmission surface S51 and the third transmission surface S53. The first transmission surface S51 is on a surface extended from the first surface S11 of the light guide member 10, the second transmission surface S52 is a curved surface which is bonded integrally to the second surface S12 by an adhesive layer CC, and the third transmission surface S53 is on a surface extended from the third surface S13 of the light guide member 10. Of these, the second transmission surface S52 and the second surface S12 of the light guide member 10 are integrated by bonding through the thin adhesive layer CC, and thus have a shape having substantially the same curvature.

The light transmission member (auxiliary optical block) 50 exhibits a high light transmission property in a visible region, and a main body portion of the light transmission member 50 is formed of thermoplastic resin material having a refractive index which is substantially the same as the main body 10s of the light guide member 10. In addition, the light transmission member 50 is formed by hard coat deposition along with the main body 10s in a state where the main body portion is bonded to the main body 10s of the light guide member 10. That is, similarly to the light guide member 10, in the light transmission member 50, a hard coat layer 27 is formed on the surface of the main body portion. The first transmission surface S51 and the third transmission surface S53 are surfaces which are formed of the hard coat layer 27 on the surface of the main body portion.

Hereinafter, the optical path of video light GL or the like in the virtual image display apparatus 100 will be described. The video light GL emitted from the video display element (video element) 82 is incident on the third surface S13 having positive refractive power provided in the light guide member 10.

The video light GL which is incident on the third surface S13 of the light guide member 10 and passes therethrough advances while being radiated and is reflected on the fourth surface S14 having negative refractive power.

The video light GL reflected on the fourth surface S14 is incident on the third surface S13 again. Here, the third surface S13 has relatively weak positive refractive power with respect to the video light GL and totally reflects the video light GL. The video light GL totally reflected on the third surface S13 is incident on the first surface S11 having relatively weak negative refractive power and then totally reflected thereon.

While the video light GL totally reflected on the first surface S11 is incident on the second surface S12, in particular, the video light GL incident on the half mirror layer 15 is partially transmitted through and partially reflected on the half mirror layer 15 and is incident on the first surface S11 and passes therethrough again. In addition, the half mirror layer 15 acts as having relatively strong positive refractive power with respect to the video light GL to be reflected on the half mirror layer 15. Further, the first surface S11 acts as having negative refractive power with respect to the video light GL passing therethrough.

The video light GL passing through the first surface S11 is incident on the pupil of the eyes EY of the observer or an equivalent position as a substantially parallel light flux. That is, the observer observes an image formed on the video display element (video element) 82 by video light GL as a virtual image. Further, the video light GL is guided without forming an intermediate image in the light guide member 10 during the time from incidence to the third surface S13 to emission from the first surface S11.

Meanwhile, out of external light HL, a light component which is incident on a +X side from the second surface S12 of the light guide member 10 passes through the third surface S13 and the first surface S11, and at this time, positive and negative refractive powers are cancelled and aberration is corrected. That is, the observer observes an outside image with little distortion over the light guide member 10. Similarly, out of external light HL, a light component which is incident on a −X side from the second surface S12 of the light guide member 10, that is, a light component which is incident on the light transmission member 50, passes through the third transmission surface S53 and the first transmission surface S51 provided in the light transmission member 50, and at this time, positive and negative refractive power are cancelled and aberration is corrected. That is, the observer observes an outside image with little distortion over the light transmission member 50. Out of external light HL, a light component which is incident on the light transmission member 50 corresponding to the second surface S12 of the light guide member 10 passes through the third transmission surface S53 and the first surface S11, and at this time, positive and negative refractive powers are cancelled and aberration is corrected. That is, the observer observes an outside image with little distortion over the light transmission member 50. Further, the second surface S12 of the light guide member 10 and the second transmission surface S52 of the light transmission member 50 have substantially the same curved surface shape and substantially the same refractive index, and the gap of both surfaces is filled with the adhesive layer CC having substantially the same refractive index. That is, the second surface S12 of the light guide member 10 or the second transmission surface S52 of the light transmission member 50 does not act as a refraction surface with respect to external light HL.

However, since external light HL incident on the half mirror layer 15 is partially transmitted through and partially reflected by the half mirror layer 15, external light HL from a direction corresponding to the half mirror layer 15 is vulnerable to the transmittance of the half mirror layer 15. Meanwhile, since video light GL is incident from a direction corresponding to the half mirror layer 15, the observer observes an outside image along with an image formed on the video display element (video element) 82 in the direction of the half mirror layer 15.

Out of video light GL which propagates through the light guide member 10 and is incident on the second surface S12, a light component which has not been reflected on the half mirror layer 15 is incident on the light transmission member 50, and is prevented from being returned to the light guide member 10 by an antireflection portion (not illustrated) provided in the light transmission member 50. That is, video light GL passing through the second surface S12 is prevented from being returned to the optical path and becoming stray light. Furthermore, external light HL which is incident from the light transmission member 50 side and reflected by the half mirror layer 15 is returned to the light transmission member 50, and is prevented from being emitted to the light guide member 10 by the antireflection portion (not illustrated) provided in the light transmission member 50. That is, external light HL reflected by the half mirror layer 15 is prevented from being returned to the optical path and becoming stray light.

Figure 3:
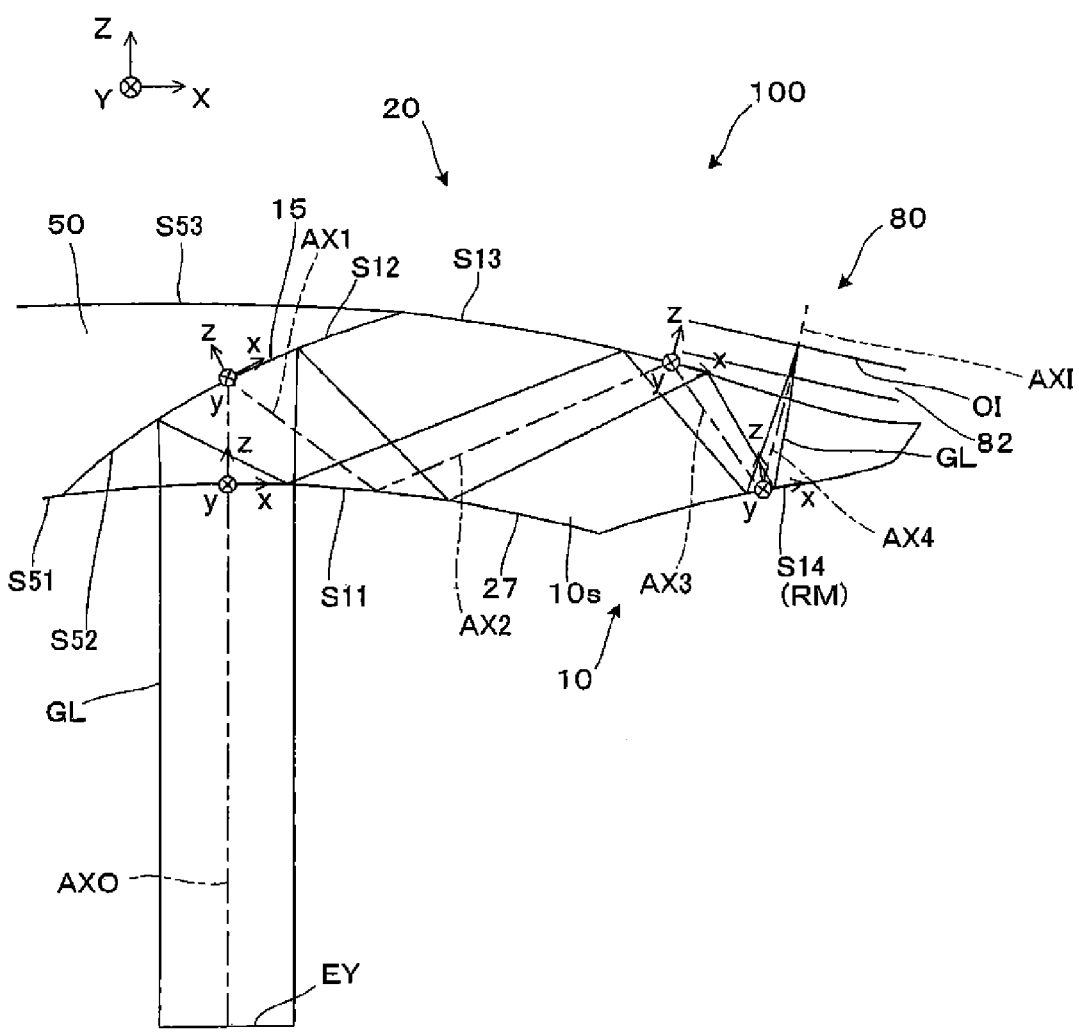
FIG. 3 is a cross-sectional view describing an optical surface and an optical path of a light guide member in the virtual image display apparatus.

FIG. 3 is a view illustrating the optical axes AX1 to AX4 in the light guide member 10 or local coordinates. In the following description, considering the evaluation of the optical system or convenience of expression, an optical surface or an optical path is defined in terms of a reverse direction from the eyes EY of the observer toward the video display element 82 of the image display device 80. In an actual optical system, while light emitted from the video display element 82 sequentially passes through the inside of the light guide member 10 and reaches the eyes EY, in this state, the evaluation of the optical system is difficult. For this reason, evaluation and design are performed assuming that light from an infinitely distant light source from a stop at the position of the eyes EY passes through the light guide member 10 and is imaged on the video display element 82, and data of the optical system described below in detail are displayed in this order. In addition, the light transmission member 50 which is bonded to the light guide member 10 and used integrally is the extension of the shape of the light guide member 10, and description thereof will be omitted.

In the light guide member 10 illustrated in the figure, the optical axis of the first surface S11 matches the emission-side optical axis AXO, and the local coordinate (x, y, z) of the first surface S11 has a translational relationship with global coordinate (X, Y, Z) and has an origin on the first surface S11. That is, a z direction of the local coordinate is an advancing direction (a reverse direction of a light beam) on the emission-side optical axis AXO, and a y direction of the local coordinate is in parallel with the Y direction of the global coordinate. In the subsequent surfaces, the y direction of the local coordinate is in parallel with the Y direction of the global coordinate.

The optical axis of the second surface S12 is appropriately inclined with respect to the emission-side optical axis AXO, and the local coordinate of the second surface S12 is appropriately rotated around the Y-axis and translated with respect to the global coordinate and has an origin on the second surface S12. A z direction of the local coordinate of the second surface S12 is an intermediate direction between the emission-side optical axis AXO and the optical axis AX1 at the center of a light flux from the second surface S12 toward the first surface S11.

An origin of the local coordinate of the third surface S13 is on the third surface S13. In addition, the z direction of the local coordinate of the third surface S13, that is, the optical axis of the third surface S13, is a bisector of the optical axis AX2 at the center of a light flux from the first surface S11 to the third surface S13 and the optical axis AX3 at the center of a light flux from the third surface S13 to the fourth surface S14.

Thus, an intermediate direction between the optical axis AX1 at the center of a light flux from the second surface S12 toward the first surface S11 and the optical axis AX2 at the center of a light flux from the first surface S11 toward the third surface S13 matches a normal direction of the first surface S11 at the center (an intersection point of the optical axes AX1 and AX2) of a light flux on the first surface S11. Further, an intermediate direction between the optical axis AX2 at the center of a light flux from the first surface S11 toward the third surface S13 and the optical axis AX3 at the center of a light flux from the third surface S13 toward the fourth surface S14 matches a normal direction of the third surface S13 at the center (an intersection point of the optical axes AX2 and AX3) of a light flux on the third surface S13.

In an optical path from the third surface S13 toward the next fourth surface S14, the local coordinate corresponds to an advancing direction (a reverse direction of a light beam). That is, the z direction of the local coordinate from the third surface S13 to the fourth surface S14 matches the optical axis AX3 at the center of the light flux, and a y direction of the local coordinate is in parallel with the Y direction of the global coordinate.

The origin of the local coordinate of the fourth surface S14 is on the fourth surface S14. Further, the z direction of the local coordinate of the fourth surface S14, that is, the optical axis of the fourth surface S14, is a bisector of the optical axis AX3 at the center of the light flux from the third surface S13 toward the fourth surface S14 and of the optical axis AX4 at the center of the light flux from the fourth surface S14 toward the third surface S13 as a light incidence surface.

The shape of the first surface S11 of the light guide member 10 is expressed using the local coordinate (x, y, z) of the first surface S11.

$$z = \Sigma \{A1_{m,n} \cdot (x^m \cdot y^n)\} \quad (4)$$

Here, $A1_{m,n}$ is a coefficient of the (m·n)th term expanded as a polynomial, and m and n are integers of 0 or greater.

The shape of the second surface S12 of the light guide member 10 is expressed using the local coordinate (x, y, z) of the second surface S12.

$$z = \Sigma \{A2_{m,n} \cdot (x^m \cdot y^n)\} \quad (5)$$

Here, $A2_{m,n}$ is a coefficient of the (m·n)th term expanded as a polynomial.

The shape of the third surface S13 of the light guide member 10 is expressed using the local coordinate (x, y, z) of the third surface S13.

$$z = \Sigma \{A3_{m,n} \cdot (x^m \cdot y^n)\} \quad (6)$$

Here, $A3_{m,n}$ is a coefficient of the (m·n)th term expanded as a polynomial.

In this embodiment, the first to third surfaces S11 to S13 of the light guide member 10 satisfy the following three conditions.

$$-2 \times 10^{-1} < A1_{0,2} + A1_{2,0} < -10^{-3}, -2 \times 10^{-1} < A2_{0,2} + A2_{2,0} < -10^{-3}, \text{ and } -2 \times 10^{-1} < A3_{0,2} + A3_{2,0} < -10^{-3}, \quad (1)$$

$$10^{-3} < |A1_{2,0} - A1_{0,2}| < 10^{-1} \text{ and } 10^{-3} < |A3_{2,0} - A3_{0,2}| < 10^{-1} \quad (2)$$

$$-10^{-1} < A1_{0,2} < A1_{2,0} < 0 \text{ and } -10^{-1} < A3_{0,2} < A3_{2,0} < 0 \quad (3)$$

The shapes of the first to third surfaces S11 to S13 are set to satisfy the three conditions, whereby aberration correction of both external light HL and video light GL can be performed satisfactorily and excellent image quality can be obtained.

An interval between the first surface S11 and the third surface S13 of the light guide member 10 is from 3 mm to 15 mm. An inclination angle of the second surface S12 with respect to the first surface S11 is from 20° to 40°.

The shape of the fourth surface S14 of the light guide member 10 is expressed using the local coordinate (x, y, z) of the fourth surface S14.

$$z = \Sigma \{A4_{m,n} \cdot (x^m \cdot y^n)\} \quad (7)$$

Here, $A4_{m,n}$ is a coefficient of the (m·n)th term expanded as a polynomial.

As described above, in the present embodiment, the light guide member 10 includes four or more curved surfaces (in a case of FIG. 1, four surfaces of the first surface S11 to the fourth surface S14 are non-axisymmetric curved surfaces) including three or more non-axisymmetric curved surfaces as main surfaces contributing to guiding light like reflection or transmission of the video light GL, so that aberration can be sufficiently corrected and video with a wide visual angle and high performance can be displayed. Further, in the inside of the light guide member 10, the video light GL is reflected four times in total. More specifically, in a case of an example illustrated in FIG. 1, reflection is performed on the fourth surface S14 as first reflection, total reflection is performed on the third surface S13 as second reflection, total reflection is performed on the first surface S11 as third reflection, and reflection is performed on the second surface S12 as fourth reflection, and the reflected light reaches the eyes of the observer by transmitting the first surface. In this manner, since a sufficient length of an optical path can be ensured even in a case of a small optical system, the entire apparatus can be performed small in size and light in weight. Further, the light is displayed to the observer on a divergent optical path which does not allow an intermediate image to be formed in an enlarged manner so that optical design becomes easy compared to in a case of allowing an intermediate image to be formed.

Figure 4A:
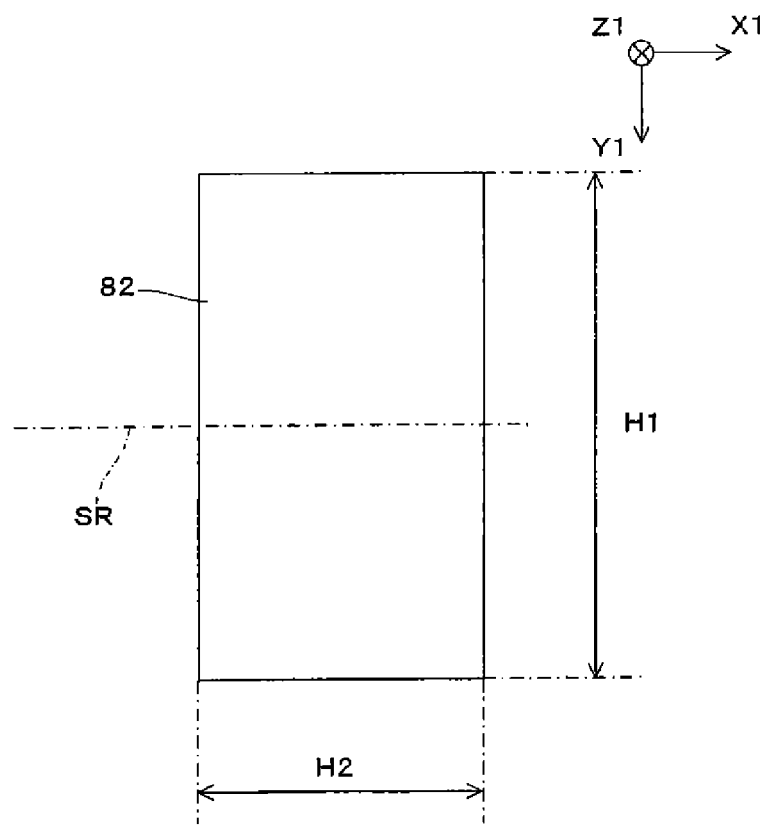
FIG. 4A is a view illustrating an example of arrangement of an image display element with respect to a reference surface and FIG. 4B is a view illustrating a status of an image formed in a state of FIG. 4A.
Figure 4B:
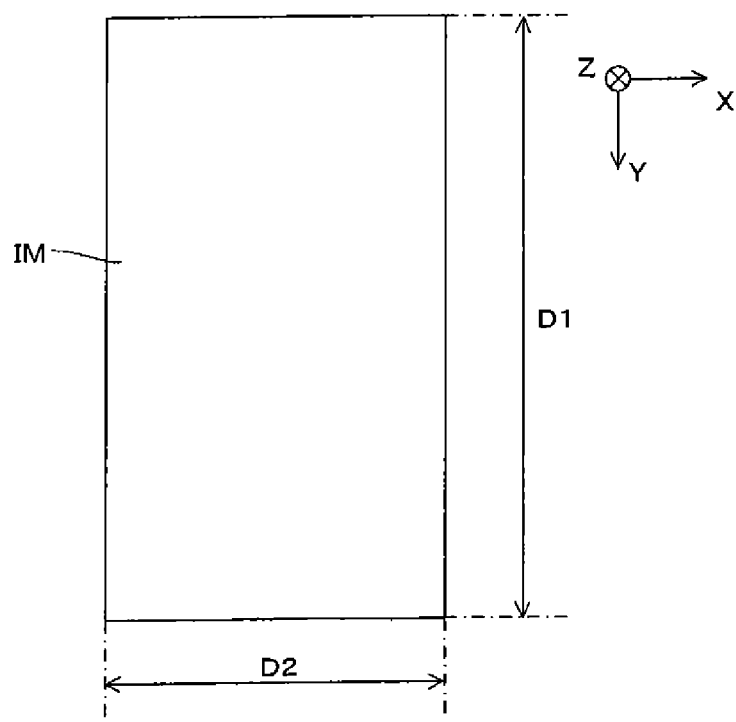

Hereinafter, an example of the configuration of the video display element 82 which is a video element among the above-described respective units will be described with reference to FIGS. 4A and 4B. FIG. 4A is a view conceptually illustrating an example of the configuration of the video display element 82 and FIG. 4B is a view conceptually illustrating a status of a virtual image visually recognized by the video display element 82 of the configuration of FIG. 4A. Further, as illustrated in FIG. 4A, the video display element 82 is rectangular in a front view, and here, the length among outer circumferences of the rectangular video display element 82 in the longitudinal direction is set as a long side H1 and the length thereof in the short direction is set as a short side H2. Further, as understood with reference to FIG. 2, an X1 direction extending from the short side H2 illustrated in FIG. 4A, a Y1 direction extending from the long side H1, and a Z1 direction orthogonal to the X1 direction and the Y1 direction are respectively directions corresponding to an X direction, a Y direction, and a Z direction. Further, the Y1 direction is parallel to the Y direction. In the example of the figure, in the video display element 82, the long side H1 is orthogonal to the reference surface SR which is a plane of symmetry of the optical system. In other words, the long side H1 of the video display element 82 is arranged so as to be vertically long such that the long side H1 extends along the Y1 direction (Y direction) with respect to the reference surface SR parallel to the XZ surface. In this case, as illustrated in FIG. 4B, in a visually recognized image IM, a width D1 in the longitudinal direction (Y direction) vertical to the direction parallel to the eyes EY of the observer is formed to be vertically longer than a width D2 in the lateral direction (X direction). In general, when it is demanded that the apparatus be small in size and light in weight, even the size of the video display element is limited and the size of a display screen, that is, the size of an image, is limited. Consequently, the amount of information which can be displayed on the display screen is limited. Particularly, in a case where the video light GL is guided along the direction parallel to the reference surface SR as described above, the limitation on the lateral direction (X direction) becomes strong, so that the light guide member 10 is required to be thickened in order to make a display range larger in the lateral direction. In contrast, in the present embodiment, the long side H1 of the video display element 82 is made to be orthogonal to the reference surface SR as described above. In other words, the width of the video display element 82 in the direction along the reference surface SR is arranged to be shorter, so that the light guide member 10 can be maintained to be thin according to the demand for miniaturization and more information can be displayed by securing the size of the display screen. Further, as illustrated in FIG. 4B, in a case where the image IM which is vertically long is visually recognized, more information on characters can be easily displayed and this becomes effective for the virtual image display apparatus 100 to function as an information display terminal.

EXAMPLES

Hereinafter, examples of the light guide member assembled in the virtual image display apparatus according to the invention will be described. Symbols used in each example are summarized below.

EPP: pupil

FFSk: free-form curved surface (k in light guide member=surface number)

SPH: spherical surface or plane (protection glass surface)

IMAGE: image surface (surface of video element)

θ: angle between z-axis of local coordinate of each curved surface and Z-axis of entire body Nd: refractive index of optical material with respect to d line Vd: Abbe number of optical material with respect to d line Example 1

Data on the optical surfaces constituting the light guide member of Example 1 are listed in Table 1 below. Here, light beams which allow the video light to be reversed from the position of the eyes are tracked and the measurement is performed. The symbol FFSk (k=1 to 4) means a k-th surface among the first to fourth surfaces S11 to S14 which are free-form curved surfaces. That is, FFS1 means the first surface S11, FFS2 means the second surface S12, FFS3 means the third surface S13, and FFS4 means the fourth surface S14. Further, the symbol EP means the position of the pupils, that is, the position of the eyes EY. Further, here, in regard to each free-form curved surface constituting light guide member, a relative positional relationship between the origins of local coordinates of each curved surface with coordinates (XYZ coordinates) on the X-axis, the Y-axis, and the Z-axis which are axes of the entirety is indicated and the orientation of each surface is described using an angle θ indicating the angle between the z-axis (local z-axis) of the local coordinate of each curved surface and the entire Z-axis by setting the symbol EP indicating the position of pupils as a reference position, that is, an absolute origin with respect to the whole.

TABLE 1

| No | Type | X | Y | Z | θ | Nd | Vd |
|----|------|-------|-------|--------|--------|-------|-------|
| 1 | EP | 0.000 | 0.000 | 0.000 | 0.00 | | |
| 2 | FFS1 | 0.000 | 0.000 | 20.000 | 0.00 | 1.525 | 55.95 |
| 3 | FFS2 | 0.000 | 0.000 | 23.800 | 26.50 | 1.525 | 55.95 |
| 4 | FFS1 | 0.000 | 0.000 | 20.000 | 0.00 | 1.525 | 55.95 |
| 5 | FFS3 | 16.442 | 0.000 | 24.312 | −15.92 | 1.525 | 55.95 |
| 6 | FFS4 | 19.776 | 0.000 | 19.566 | 10.08 | 1.525 | 55.95 |
| 7 | FFS3 | 16.442 | 0.000 | 24.312 | −15.92 | | |
| 8 | SPH | 20.871 | 0.000 | 23.745 | −13.59 | 1.458 | 67.82 |
| 9 | IMAGE | 21.153 | 0.000 | 24.911 | −13.59 | | |

With regard to each optical surface in the light guide member constituting Example 1, the coefficient $Ak_{m,n}$ in the polynomial expression in which a free-form curved surface is expanded is listed in Table 2. The coefficient $Ak_{m,n}$ means a coefficient of each term $x^m \cdot y^n$ constituting the polynomial expression representing the k-th surface as a target. In addition, in Table 2, symbols m and n mean variables or degrees in the coefficient $Ak_{m,n}$. Further, the symbol FFSk (k=1 to 4) means the k-th surface among the first to fourth surfaces S11 to S14 which are free-form curved surfaces as described above. In addition, since the local coordinates of each surface correspond to those in FIG. 3, illustration thereof is omitted.

TABLE 2

| m | n | FFS1 | FFS2 | FFS3 | FFS4 |
|---|---|-----------|-----------|-----------|-----------|
| 2 | 0 | −1.216E−02 | −1.545E−02 | −8.157E−03 | −8.776E−03 |
| 0 | 2 | −2.154E−02 | −1.801E−02 | −2.031E−02 | −2.269E−02 |
| 3 | 0 | 5.860E−05 | 1.865E−04 | 3.684E−04 | 2.144E−03 |
| 1 | 2 | −1.138E−04 | −4.989E−05 | −1.502E−04 | 4.815E−04 |
| 4 | 0 | 1.835E−05 | −1.739E−05 | 4.592E−05 | 2.578E−04 |
| 2 | 2 | −2.448E−05 | −1.058E−05 | −1.311E−06 | 9.037E−05 |
| 0 | 4 | 2.726E−05 | 1.822E−06 | 7.530E−06 | 1.009E−05 |
| 5 | 0 | −1.485E−06 | 6.911E−07 | 3.290E−06 | −5.592E−06 |
| 3 | 2 | −8.809E−07 | 2.346E−07 | 4.284E−07 | 6.611E−06 |
| 1 | 4 | −1.337E−06 | −1.083E−06 | −1.572E−06 | −5.948E−06 |
| 6 | 0 | 3.496E−08 | −9.389E−09 | 1.516E−07 | −1.078E−06 |
| 4 | 2 | 3.461E−08 | −7.235E−09 | 6.041E−08 | −1.328E−06 |
| 2 | 4 | −1.831E−07 | 3.073E−08 | −2.111E−07 | −2.688E−07 |
| 0 | 6 | 3.788E−09 | −7.204E−09 | 8.181E−08 | 2.214E−07 |

In Table 2 and subsequent tables, digits after E in a numerical value mean an exponent of the decimal number, and for example, "−1.216E−02" means $-1.216 \times 10^{-02}$.

Figure 5:
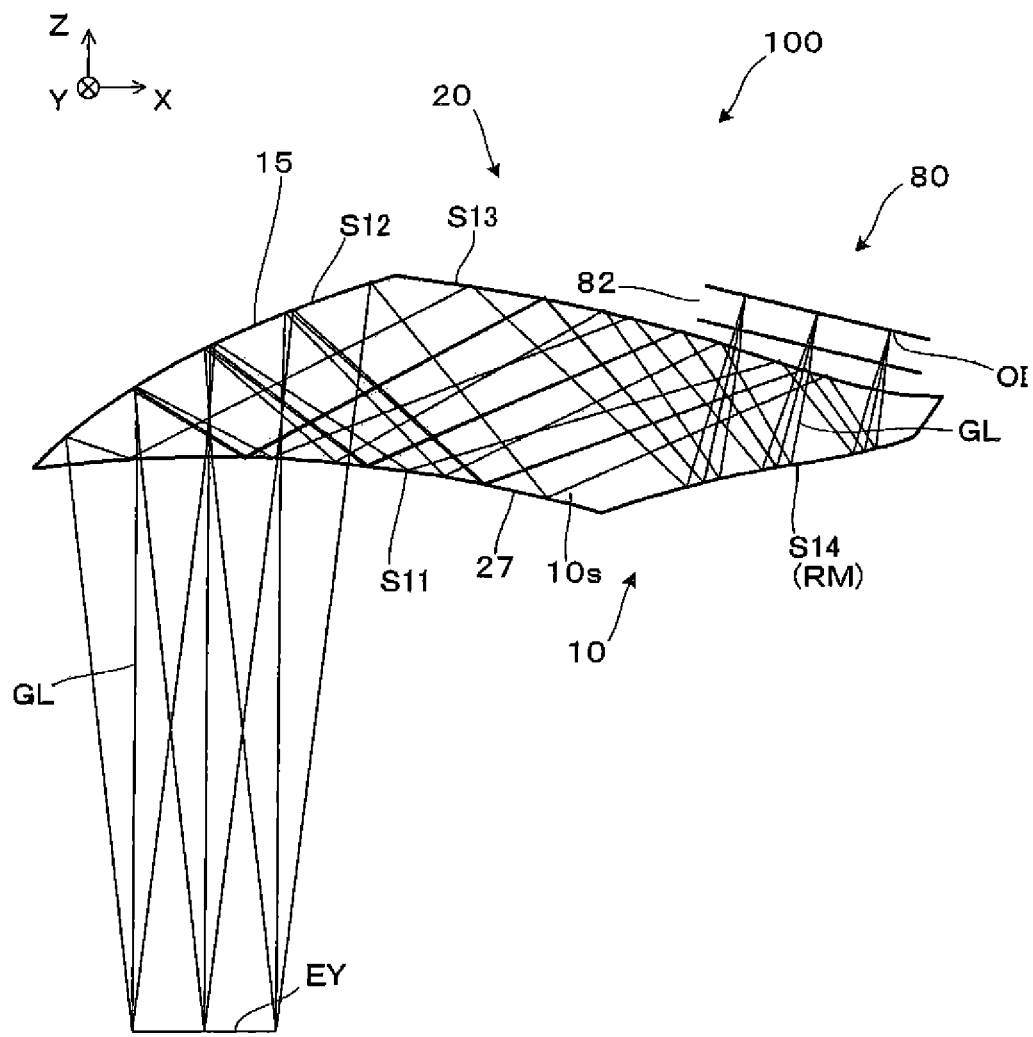
FIG. 5 is a view describing an optical system of Example 1.

FIG. 5 is a cross-sectional view of the virtual image display apparatus of Example 1. However, in regard to the light flux, only a light flux on the reference surface SR is indicated. In the virtual image display apparatus 100, the light guide member 10 includes the first surface S11 having weak negative refractive power, the second surface S12 having comparatively strong positive refractive power, the third surface S13 having comparatively weak positive refractive power, and the fourth surface S14 having negative refractive power. Here, the third surface S13 functions as a reflection surface and a refraction surface. Specifically, the third surface S13 is a total reflection surface with respect to a light flux (actually, light from the fourth surface S14) reversed from the second surface S12, and is a transmission surface with respect to a light flux (actually, light from the video display element 82) reversed from the fourth surface S14. That is, the third surface S13 has both a function of bending the optical path and a function relating to incidence of a light flux. When a specific specification of the optical system of Example 1 is described, a horizontal viewing angle is 13.6°, a vertical viewing angle is 24.0°, the size of a display area of the video display element is 5.18 mm×9.22 mm, a pupil diameter is 5.0 mm, and a focal distance is approximately 21.7 mm.

Figure 6A:
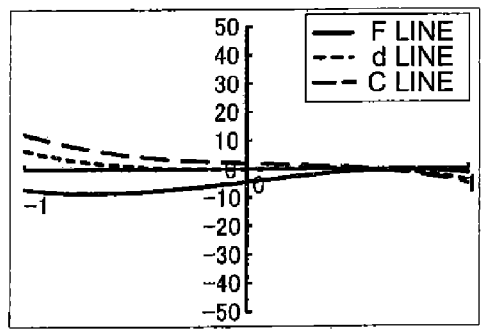
FIGS. 6A to 6F are views describing aberration of the optical system of Example 1.
Figure 6D:
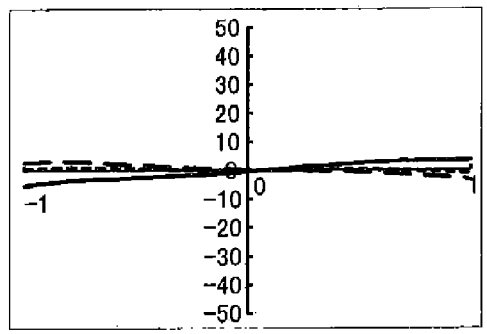
Figure 6B:
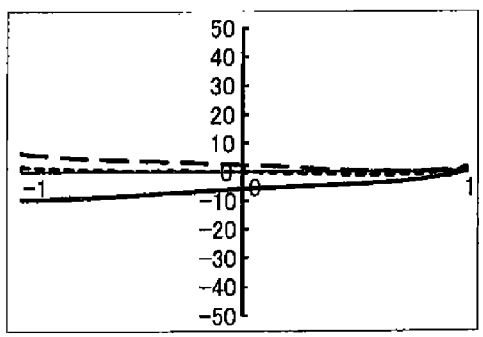
Figure 6E:
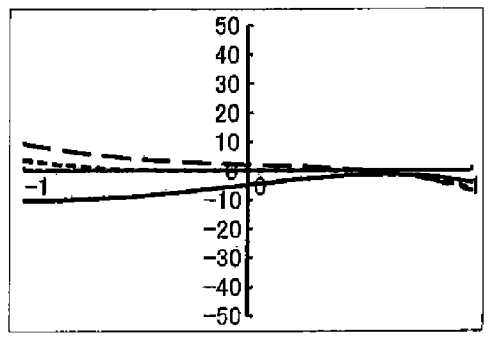
Figure 6C:
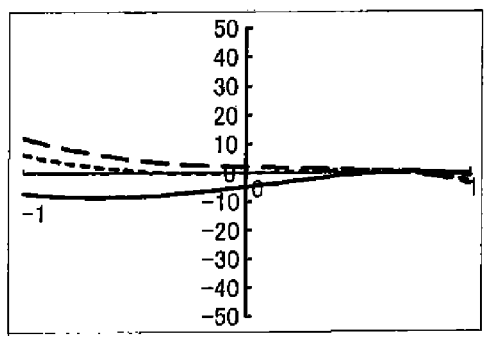
Figure 6F:
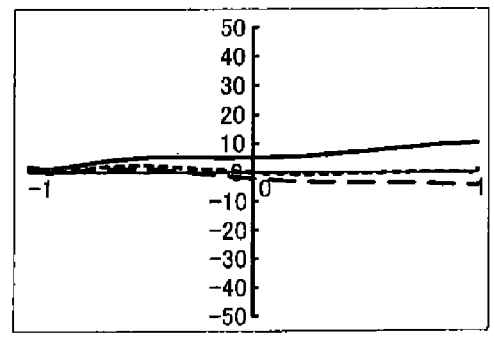
Figure 7A:
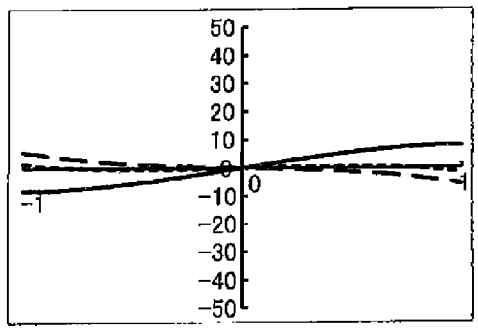
FIGS. 7A to 7F are views describing aberration of the optical system of Example 1.
Figure 7D:
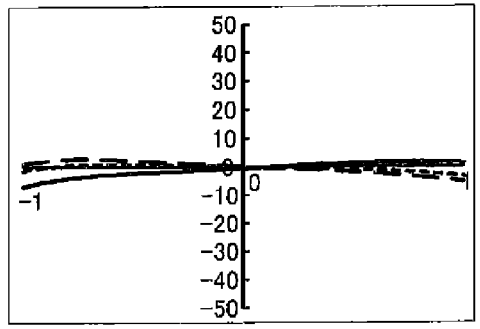
Figure 7B:
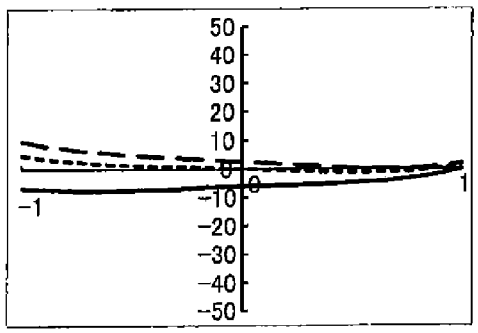
Figure 7E:
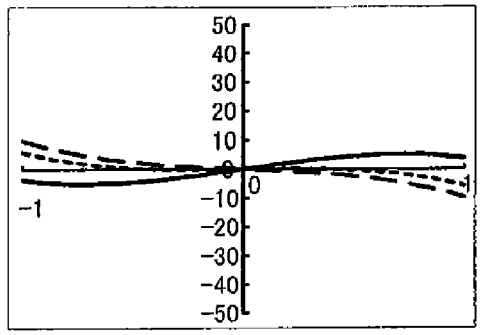
Figure 7C:
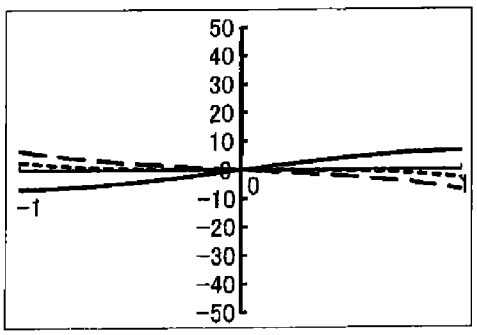
Figure 7F:
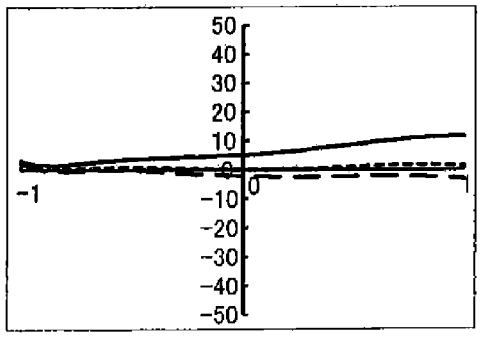

FIGS. 6A to 6F and 7A to 7F show aberration of Example 1. In each aberration diagram, the horizontal axis represents a position in a pupil, and the vertical axis represents the amount of aberration in a unit of microns. Specifically, FIGS. 6A and 6B show aberration in the Y and X directions at an azimuth of 6.82° in the X direction and 12.0° in the Y direction, FIGS. 6C and 6D show aberration in the Y and X directions at an azimuth of 0.0° in the X direction and 12.0° in the Y direction, and FIGS. 6E and 6F show aberration in the Y and X directions at an azimuth of −6.82° in the X direction and 12.0° in the Y direction. FIGS. 7A and 7B show aberration in the Y and x directions at an azimuth of 6.82° in the X direction and 0.0° in the Y direction, FIGS. 7C and 7D show aberration in the Y and X directions at an azimuth of 0.0° in the X direction and 0.0° in the Y direction, and FIGS. 7E and 7F show aberration in the Y and X directions at an azimuth of −6.8° in the X direction and 0.0° in the Y direction. The amount of aberration shown in the figure represents the amount of aberration on the image surface of the video display element when a light beam is reversed for convenience.

Example 2

Figure 8:
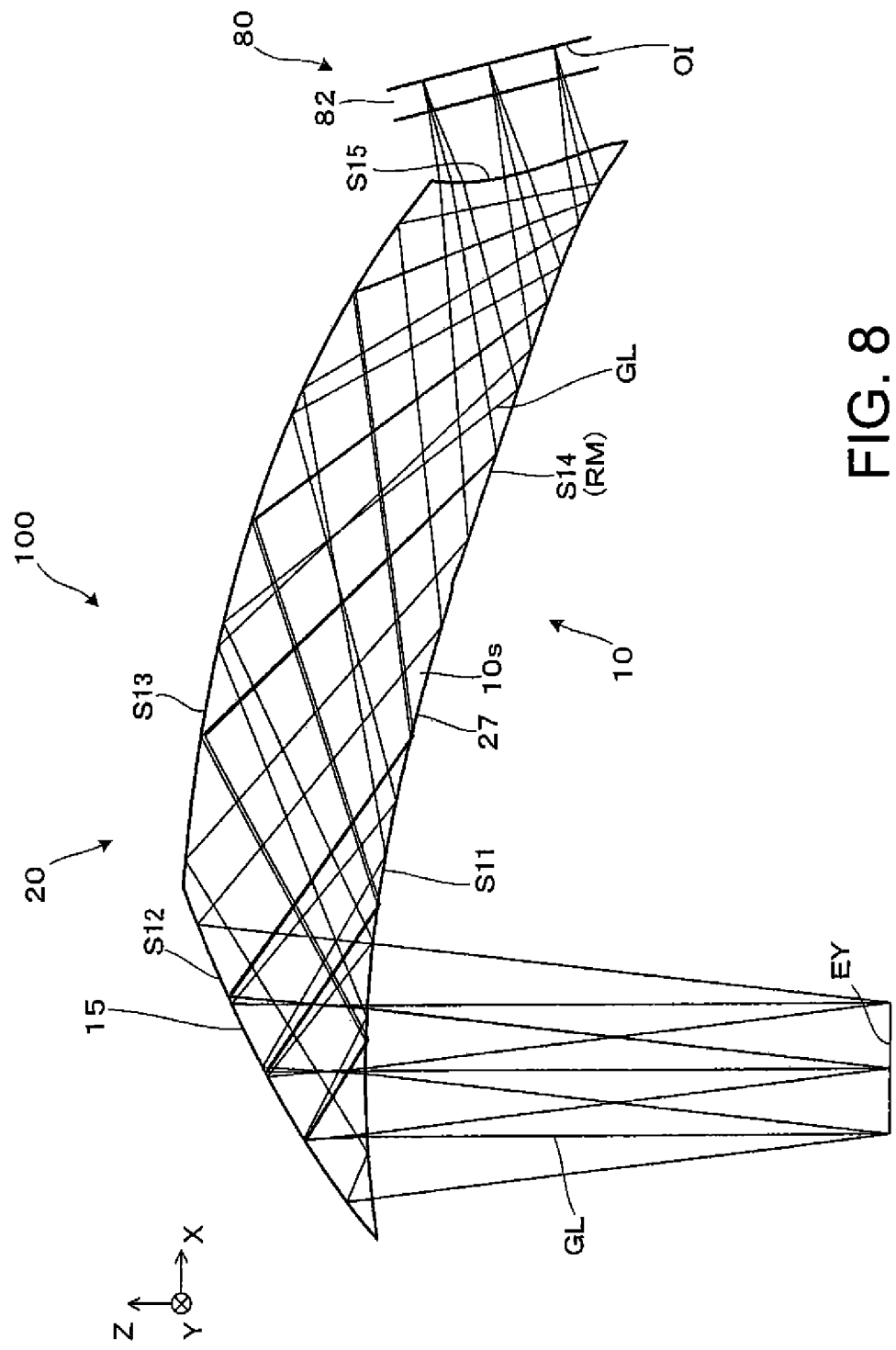
FIG. 8 is a view describing an optical system of Example 2.
Figure 9:
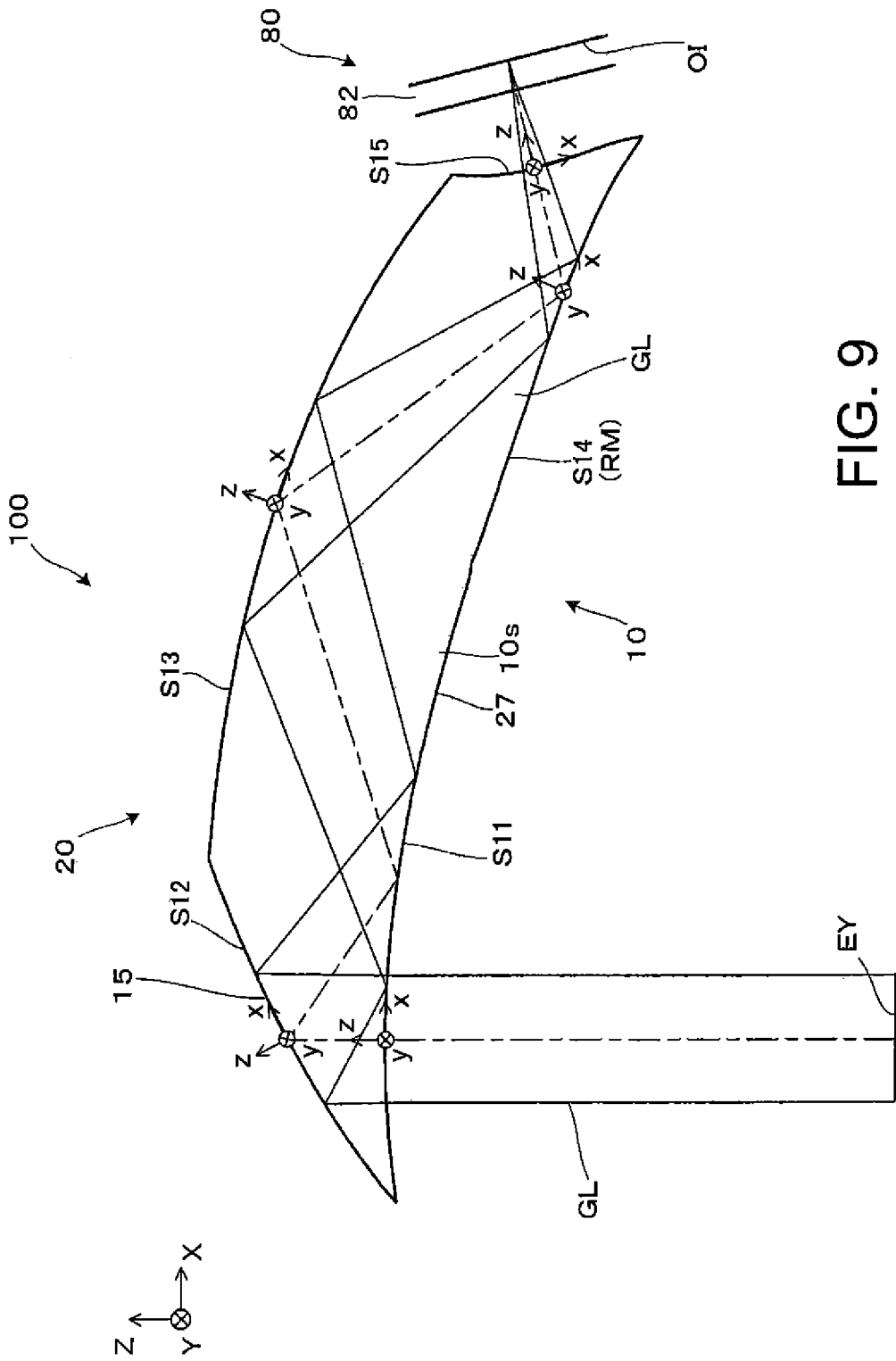
FIG. 9 is a cross-sectional view describing an optical surface and an optical path in a light guide member of Example 2.

Data on the optical surfaces constituting the light guide member of Example 2 are listed in Table 3 below. The symbol FFSk (k=1 to 5) means a k-th surface among the first to fifth surfaces S11 to S15 which are free-form curved surfaces. As illustrated in FIGS. 8 and 9, in the present example, the light guide member 10 includes a fifth surface S15 which is adjacent to the third surface S13 and the fourth surface S14.

TABLE 3

| No | Type  | X      | Y     | Z      | θ      | Nd    | Vd    |
|----|-------|--------|-------|--------|--------|-------|-------|
| 1  | PLANE | 0.000  | 0.000 | 0.000  | 0.00   |       |       |
| 2  | FFS1  | 0.000  | 0.000 | 20.000 | 0.00   | 1.525 | 55.95 |
| 3  | FFS2  | 0.000  | 0.000 | 23.800 | 28.00  | 1.525 | 55.95 |
| 4  | FFS1  | 0.000  | 0.000 | 20.000 | 0.00   | 1.525 | 55.95 |
| 5  | FFS3  | 20.951 | 0.000 | 24.378 | −17.78 | 1.525 | 55.95 |
| 6  | FFS4  | 29.223 | 0.000 | 13.084 | −19.78 | 1.525 | 55.95 |
| 7  | FFS5  | 34.070 | 0.000 | 14.312 | −75.78 |       |       |
| 8  | PLANE | 37.135 | 0.000 | 15.089 | −75.78 | 1.458 | 67.82 |
| 9  | IMAGE | 38.299 | 0.000 | 15.384 | −75.78 |       |       |

With regard to each optical surface in the light guide member constituting Example 2, the coefficient $Ak_{m,n}$ in the polynomial expression in which a free-form curved surface is expanded is listed in Table 4 below. The coefficient $Ak_{m,n}$ means a coefficient of each term $x^m \cdot y^n$ constituting the polynomial expression representing the k-th surface as a target.

TABLE 4

| m | n | FFS1       | FFS2       | FFS3       | FFS4       | FFS5       |
|---|---|------------|------------|------------|------------|------------|
| 2 | 0 | −1.166E−02 | −1.040E−02 | −1.025E−02 | −6.611E−03 | 3.852E−02  |
| 0 | 2 | −2.246E−02 | −1.212E−02 | −2.117E−02 | −1.410E−02 | −3.250E−03 |
| 3 | 0 | 4.037E−05  | 2.271E−04  | −1.003E−04 | −9.451E−04 | −6.019E−03 |
| 1 | 2 | −1.476E−04 | −7.676E−05 | −1.817E−04 | −7.339E−04 | 2.510E−03  |
| 4 | 0 | 3.818E−06  | −6.779E−06 | −2.343E−06 | −7.506E−05 | 3.381E−04  |
| 2 | 2 | −1.178E−05 | 2.179E−05  | −8.874E−06 | −5.195E−05 | 8.523E−04  |
| 0 | 4 | −2.213E−05 | −4.541E−06 | −1.588E−05 | −2.891E−05 | 2.750E−04  |
| 5 | 0 | −4.334E−08 | 2.892E−07  | −9.163E−08 | −3.451E−06 | 6.363E−05  |
| 3 | 2 | 1.438E−06  | −1.081E−06 | −1.960E−07 | −3.434E−07 | 8.278E−05  |
| 1 | 4 | −2.619E−06 | 4.643E−07  | −6.277E−07 | −6.069E−06 | −2.442E−05 |
| 6 | 0 | 5.162E−10  | 1.444E−08  | −2.654E−09 | −7.572E−08 | −4.376E−05 |
| 4 | 2 | −2.188E−08 | 9.468E−08  | −1.856E−08 | 5.477E−08  | −2.603E−05 |
| 2 | 4 | 2.259E−07  | 7.496E−08  | −2.385E−08 | −3.116E−07 | −1.548E−06 |
| 0 | 6 | 9.079E−08  | 1.872E−08  | −2.947E−09 | 2.070E−08  | −3.013E−06 |

FIG. 8 is a cross-sectional view of the virtual image display apparatus of Example 2. However, in regard to the light flux, only a light flux on the reference surface SR is indicated. Further, FIG. 9 is a view illustrating the local coordinates in the light guide member. In the virtual image display apparatus 100, the light guide member 10 includes the first surface S11 having weak negative refractive power, the second surface S12 having comparatively strong positive refractive power, the third surface S13 having comparatively weak positive refractive power, and the fourth surface S14 having negative refractive power. Further, in the present example, as described above, the light guide member 10 includes a fifth surface S15 which is continuously adjacent to the third surface S13. In addition, as described in the figure, the fifth surface S15 is a light incidence surface. In contrast, the third surface S13 functions only as a reflection surface. That is, both of the functions of the third surface S13 of Example 1 are shared by the third surface S13 and the fifth surface S15 in Example 2. When a specific specification of the optical system of Example 2 is described, a horizontal viewing angle is 13.6°, a vertical viewing angle is 24.0°, the size of a display area of the video display element is 5.18×9.22 mm, a pupil diameter is 5.0 mm, and a focal distance is approximately 21.7 mm.

Figure 10A:
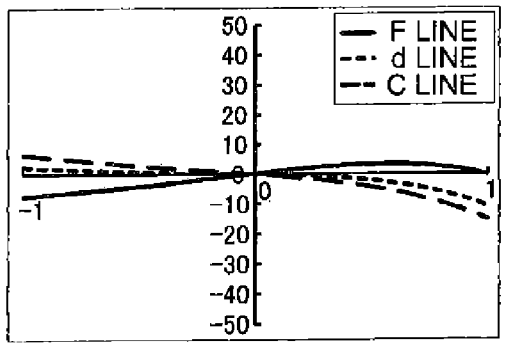
FIGS. 10A to 10F are views describing aberration of the optical system of Example 2.
Figure 10D:
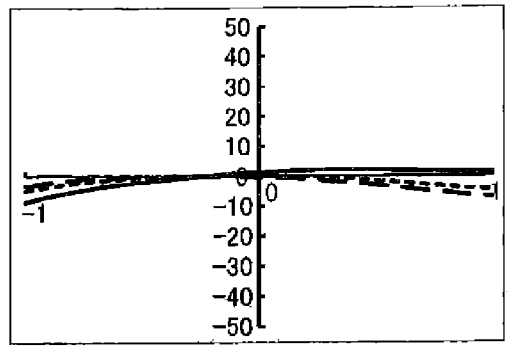
Figure 10B:
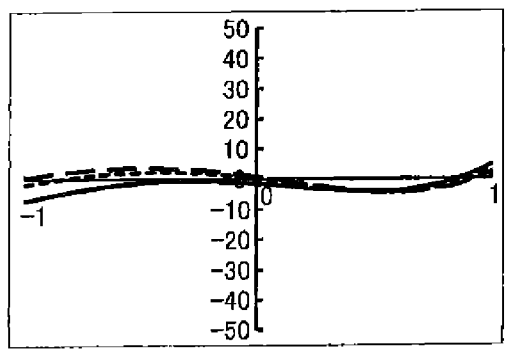
Figure 10E:
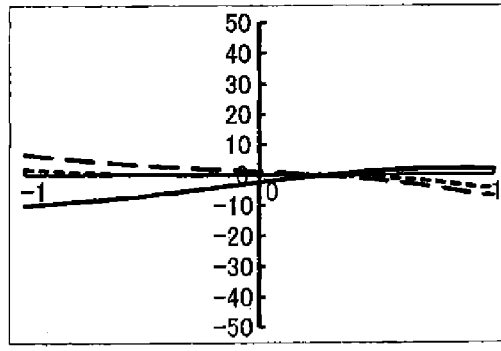
Figure 10C:
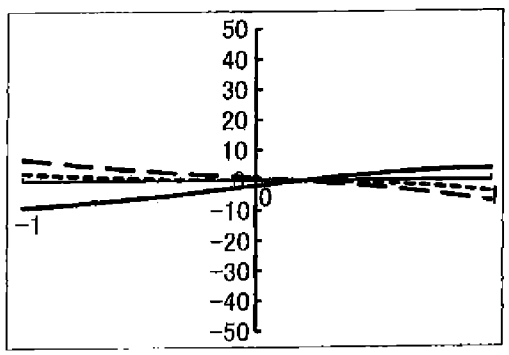
Figure 10F:
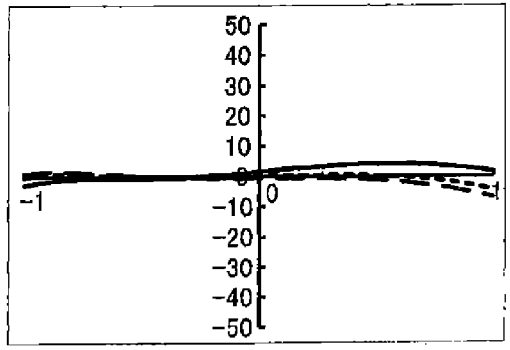
Figure 11A:
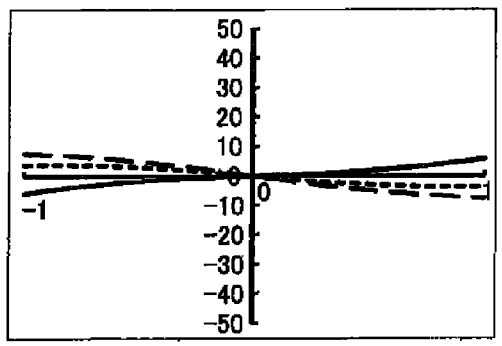
FIGS. 11A to 11F are views describing aberration of the optical system of Example 2.
Figure 11B:
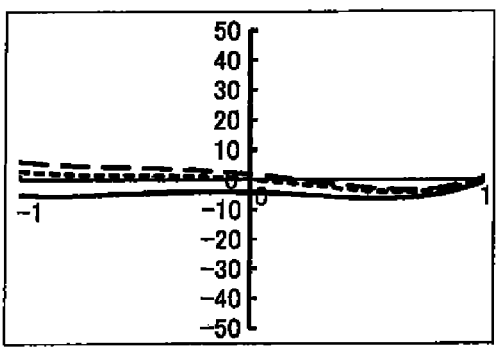
Figure 11C:
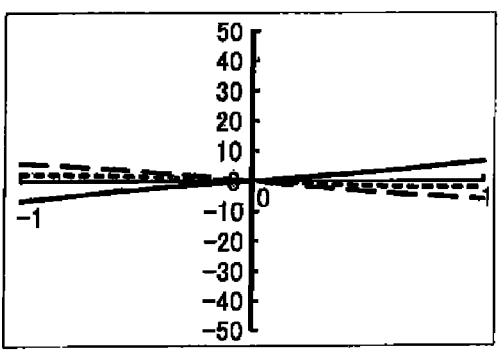
Figure 11D:
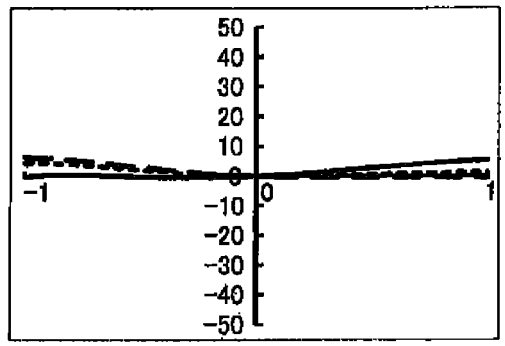
Figure 11E:
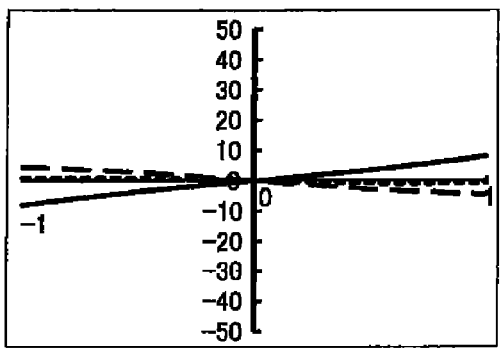
Figure 11F:
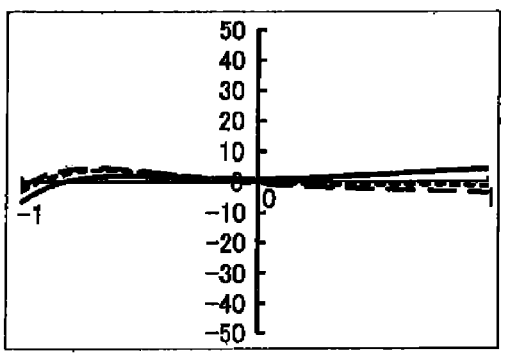

FIGS. 10A to 10F and 11A to 11F show aberration of Example 2. In each aberration diagram, the horizontal axis represents a position in a pupil, and the vertical axis represents the amount of aberration in a unit of microns. Specifically, FIGS. 10A and 10B show aberration in the Y and X directions at an azimuth of 6.82° in the x direction and 12.0° in the Y direction, FIGS. 10C and 10D show aberration in the Y and X directions at an azimuth of 0.0° in the X direction and 12.0° in the Y direction, and FIGS. 10E and 10F show aberration in the Y and X directions at an azimuth of −6.82° in the X direction and 12.0° in the Y direction. FIGS. 11A and 11B show aberration in the Y and X directions at an azimuth of 6.82° in the X direction and 0.0° in the Y direction, FIGS. 11C and 11D show aberration in the Y and X directions at an azimuth of 0.0° in the X direction and 0.0° in the Y direction, and FIGS. 11E and 11F show aberration in the Y and X directions at an azimuth of −6.8° in the X direction and 0.0° in the Y direction. The amount of aberration shown in the figure represents the amount of aberration on the image surface of the video display element when a light beam is reversed for convenience.

Example 3

Figure 12:
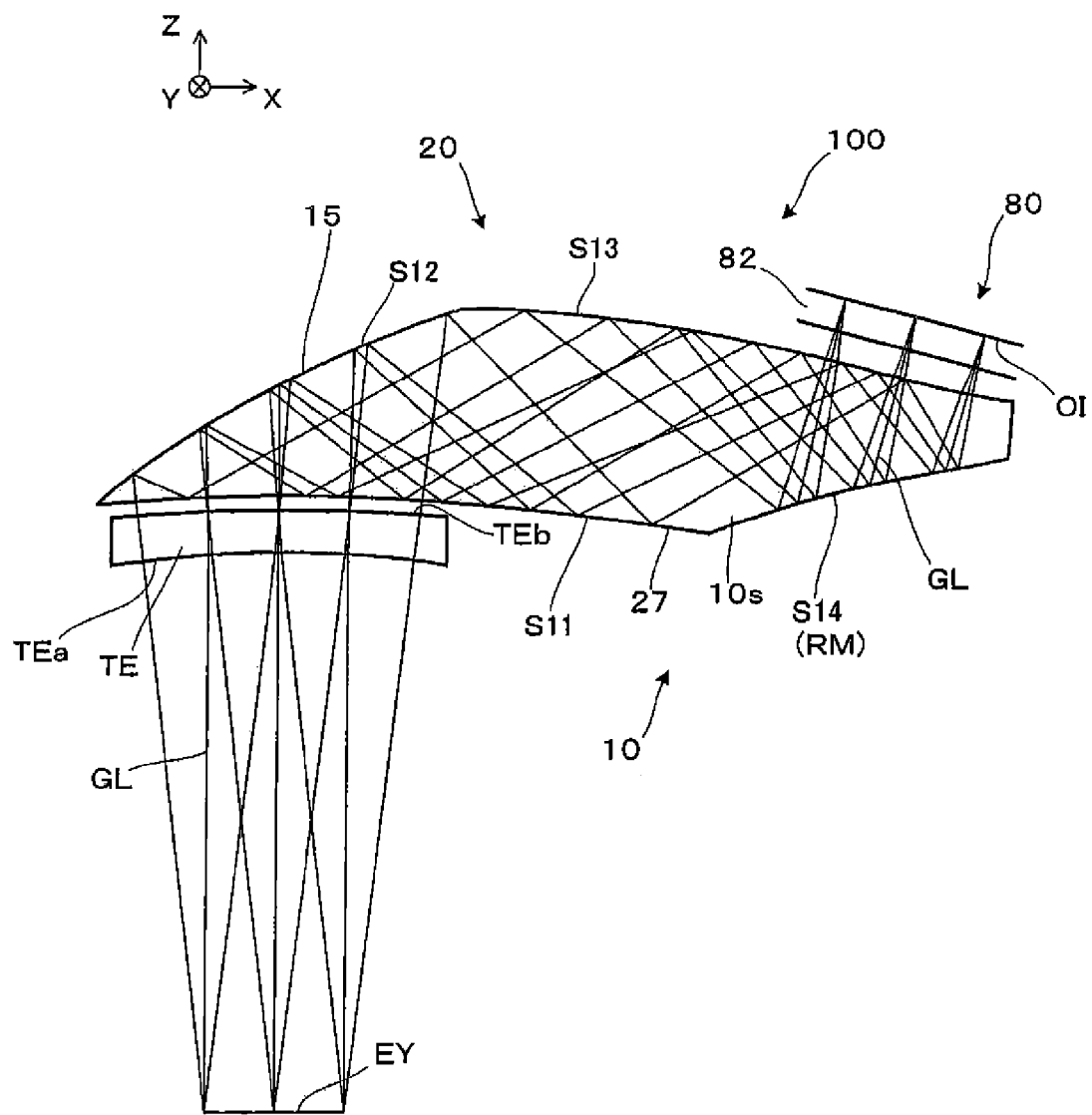
FIG. 12 is a view describing an optical system of Example 3.
Figure 13:
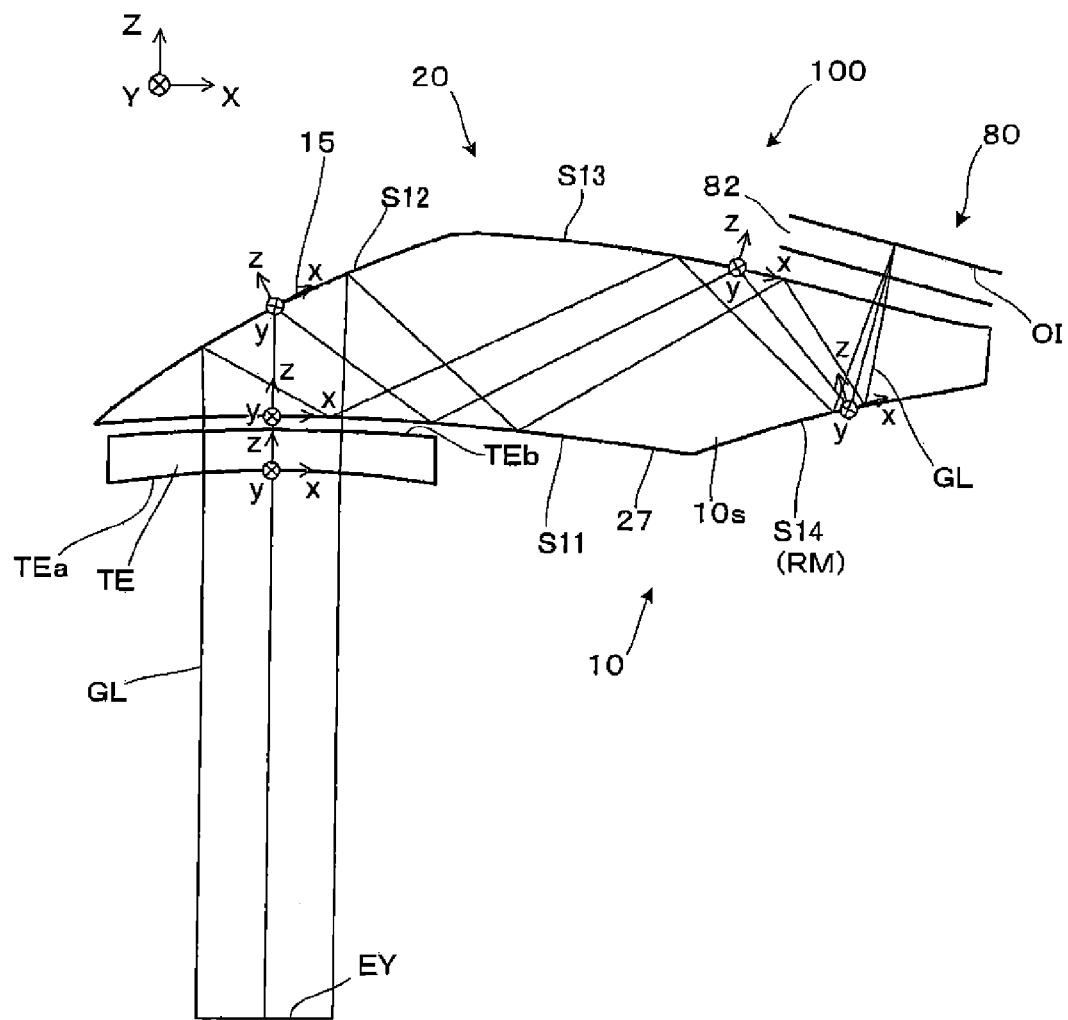
FIG. 13 is a cross-sectional view describing an optical surface and an optical path in a light guide member of Example 3.

Hereinafter, the virtual image display apparatus of Example 3 will be described. In the present example, as illustrated in FIGS. 12 and 13, a transmission optical element TE is further included as a light transmissive member provided with the light guide member 10. The transmission optical element TE is provided between the first surface S11 and the eyes EY as an optical path post stage, that is, a light emission surface of the light guide member 10, and includes a first transmission surface TEa and a second transmission surface TEb as surfaces contributing to guiding video light. The first transmission surface TEa is a surface on an eyes EY side and functions as a light emission surface which emits light toward the eyes EY. In contrast, the second transmission surface TEb is a light incidence surface to which the light emitted from the first surface S11 is incident. Among these surfaces constituting the transmission optical element TE, since at least one surface is non-spherical (free-form curved surface), it is possible for the transmission optical element TE to adjust the optical path through which video light passes and to correct aberration. Further, the second transmission surface TEb facing the first surface S11 has a shape which is the same as that of the first surface S11.

Data on the optical surfaces constituting the light guide member of Example 3 are listed in Table 5 below. The Symbol FFSk (k=1 to 5) means a k-th surface among the first and second transmission surfaces TEa and TEb, and the first to fourth surfaces S11 to S14 which are free-form curved surfaces. In Table 5, FFS1 means the first transmission surface TEa, FFS2 means both the second transmission surface TEb and the first surface S11 which have the same shape as each other, FFS3 means the second surface S12, FFS4 means the third surface S13, and FFS5 means the fourth surface S14. In Table 5, FFS2 of No. 3 indicates a value related to the second transmission surface TEb and FFS2 of No. 4 and No. 6 indicates values related to the first surface S11.

TABLE 5

| No | Type  | X      | Y     | Z      | θ      | Nd    | Vd    |
|----|-------|--------|-------|--------|--------|-------|-------|
| 1  | PLANE | 0.000  | 0.000 | 0.000  | 0.00   |       |       |
| 2  | FFS1  | 0.000  | 0.000 | 20.000 | 0.00   | 1.525 | 55.95 |
| 3  | FFS2  | 0.000  | 0.000 | 21.500 | 0.00   |       |       |
| 4  | FFS2  | 0.000  | 0.000 | 22.000 | 0.00   | 1.525 | 55.95 |
| 5  | FFS3  | 0.000  | 0.000 | 26.000 | 27.00  | 1.525 | 55.95 |
| 6  | FFS2  | 0.000  | 0.000 | 22.000 | 0.00   | 1.525 | 55.95 |
| 7  | FFS4  | 16.968 | 0.000 | 27.479 | −11.83 | 1.525 | 55.95 |
| 8  | FFS5  | 21.137 | 0.000 | 22.362 | 12.17  | 1.525 | 55.95 |
| 9  | FFS4  | 16.968 | 0.000 | 27.479 | −11.83 |       |       |
| 10 | PLANE | 22.426 | 0.000 | 27.222 | −14.97 | 1.458 | 67.82 |
| 11 | IMAGE | 22.736 | 0.000 | 28.381 | −14.97 |       |       |

With regard to each optical surface in the light guide member and the transmission optical element constituting Example 3, the coefficient $Ak_{m,n}$ in the polynomial expression in which a free-form curved surface is expanded is listed in Table 6 below. The coefficient $Ak_{m,n}$ means a coefficient of each term $x^m \cdot y^n$ constituting the polynomial expression representing the k-th surface as a target.

TABLE 6

| m | n | FFS1       | FFS2       | FFS3       | FFS4       | FES5       |
|---|---|------------|------------|------------|------------|------------|
| 2 | 0 | −1.395E−02 | −7.396E−03 | −1.201E−02 | −8.162E−03 | −1.413E−02 |
| 0 | 2 | −2.529E−02 | −1.944E−02 | −1.829E−02 | −1.772E−02 | −1.600E−02 |
| 3 | 0 | 3.664E−04  | 3.042E−05  | 1.894E−04  | 1.419E−04  | 8.617E−04  |
| 1 | 2 | 9.239E−05  | −3.655E−04 | −7.439E−05 | −9.157E−04 | −1.633E−03 |
| 4 | 0 | −2.261E−06 | 8.516E−06  | −9.925E−06 | 2.806E−05  | 2.388E−04  |
| 2 | 2 | −2.719E−04 | −6.053E−05 | −3.710E−05 | −5.331E−05 | −5.364E−05 |
| 0 | 4 | 5.962E−05  | 2.205E−07  | 4.586E−06  | −1.095E−05 | −6.719E−05 |
| 5 | 0 | −1.186E−05 | −8.328E−08 | −8.895E−07 | 1.980E−06  | −1.328E−06 |
| 3 | 2 | −7.704E−06 | 1.224E−06  | 1.177E−06  | −1.772E−06 | 2.429E−05  |
| 1 | 4 | −2.776E−06 | 7.664E−07  | −1.298E−06 | 1.040E−06  | 3.044E−07  |
| 6 | 0 | 5.539E−07  | −9.074E−09 | 3.514E−08  | 7.478E−08  | −2.139E−06 |
| 4 | 2 | 3.700E−06  | −8.782E−08 | 7.403E−08  | −1.259E−07 | −3.072E−07 |
| 2 | 4 | 7.174E−07  | 6.110E−09  | 8.364E−08  | −2.817E−08 | 1.818E−07  |
| 0 | 6 | −1.289E−07 | 1.437E−07  | −1.691E−09 | 1.115E−07  | 5.925E−07  |

FIG. 12 is a cross-sectional view of the virtual image display apparatus of Example 3. However, in regard to the light flux, only a light flux on the reference surface SR is indicated. Further, FIG. 13 is a view illustrating the local coordinates in the light guide member. In the virtual image display apparatus 100, the light guide member 10 includes the first surface S11 having weak negative refractive power, the second surface S12 having comparatively strong positive refractive power, the third surface S13 having comparatively weak positive refractive power, and the fourth surface S14 having negative refractive power. Further, in the present example, as described above, the virtual image display apparatus 100 further includes the transmission optical element TE having the first and second transmission surface TEa and TEb. In addition, each surface of the transmission optical elements TE can be used as a surface formed by a hard coat layer which is applied to the surface. When a specific specification of the optical system of Example 3 is described, a horizontal viewing angle is 13.6°, a vertical viewing angle is 24.0°, the size of a display area of the video display element is 5.18×9.22 mm, a pupil diameter is 5.0 mm, and a focal distance is approximately 21.7 mm.

Figure 14A:
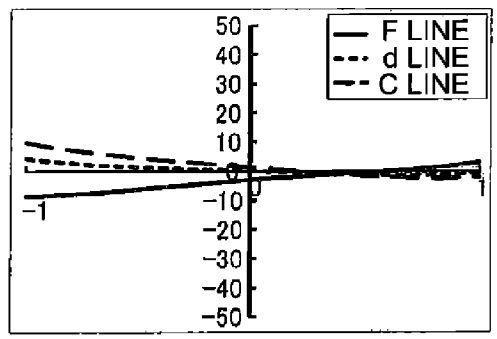
FIGS. 14A to 14F are views describing aberration of the optical system of Example 3.
Figure 14D:
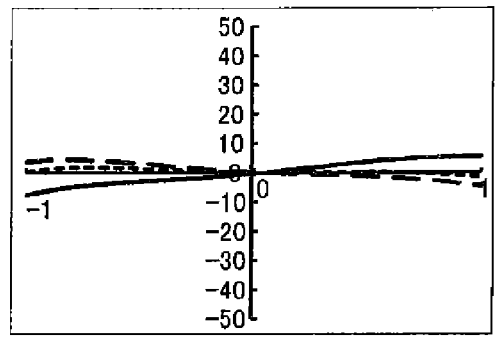
Figure 14B:
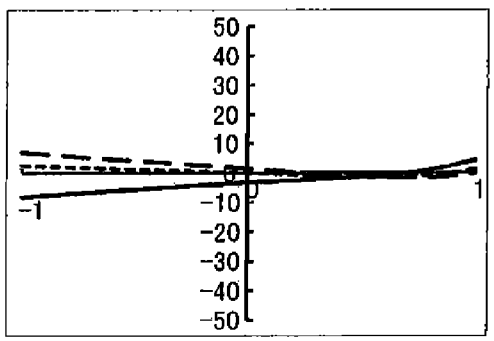
Figure 14E:
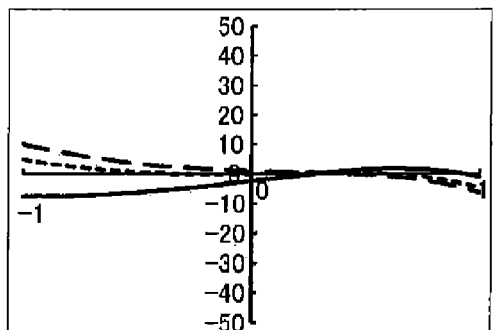
Figure 14C:
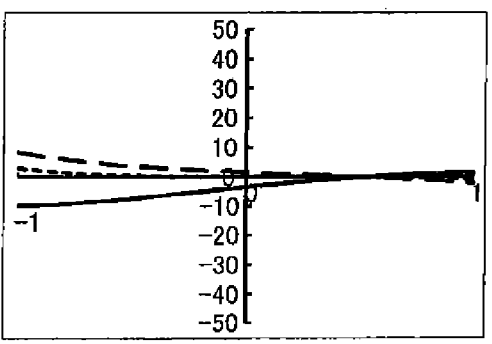
Figure 14F:
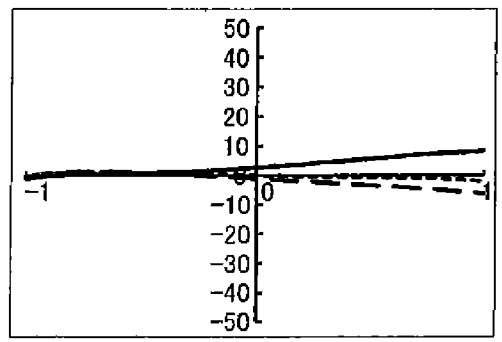
Figure 15A:
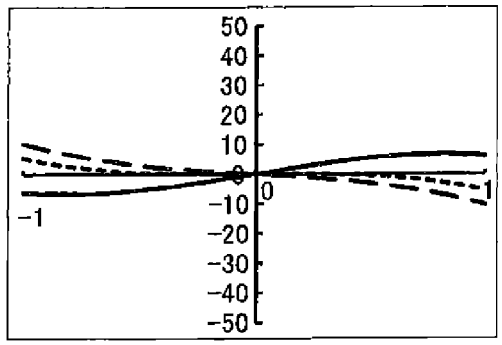
FIGS. 15A to 15F are views describing aberration of the optical system of Example 3.
Figure 15D:
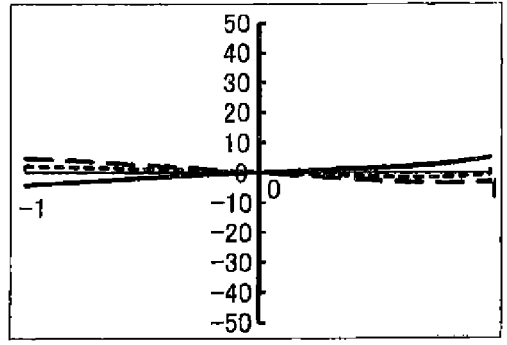
Figure 15B:
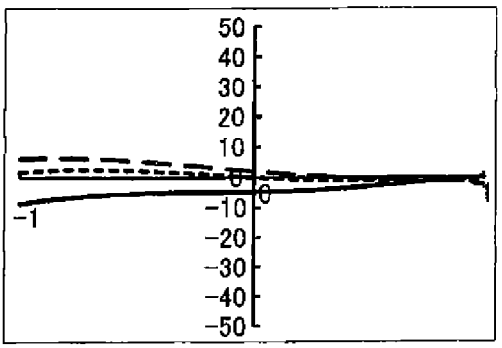
Figure 15E:
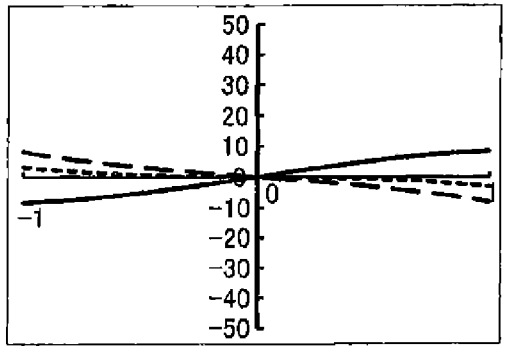
Figure 15C:
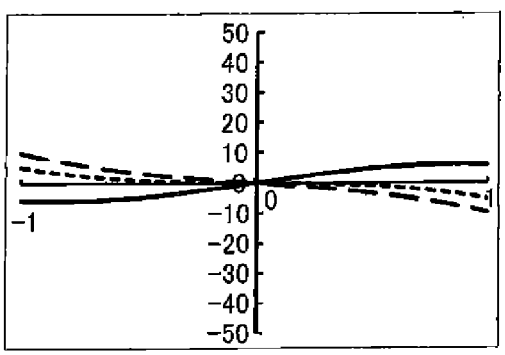
Figure 15F:
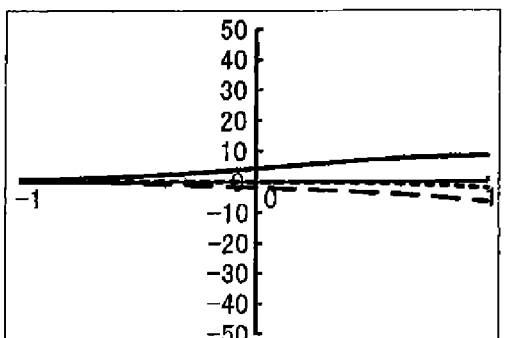

FIGS. 14A to 14F and 15A to 15F show aberration of Example 3. In each aberration diagram, the horizontal axis represents a position in a pupil, and the vertical axis represents the amount of aberration in a unit of microns. Specifically, FIGS. 14A and 14B show aberration in the Y and X directions at an azimuth of 6.82° in the X direction and 12.0° in the Y direction, FIGS. 14C and 14D show aberration in the Y and X directions at an azimuth of 0.0° in the X direction and 12.0° in the Y direction, and FIGS. 14E and 14F show aberration in the Y and X directions at an azimuth of −6.82° in the X direction and 12.0° in the Y direction. FIGS. 15A and 15B show aberration in the Y and X directions at an azimuth of 6.82° in the X direction and 0.0° in the Y direction, FIGS. 15C and 15D show aberration in the Y and X directions at an azimuth of 0.0° in the X direction and 0.0° in the Y direction, and FIGS. 15E and 15F show aberration in the Y and X directions at an azimuth of −6.82° in the X direction and 0.0° in the Y direction. The amount of aberration shown in the figure represents the amount of aberration on the image surface of the video display element when a light beam is reversed for convenience.

Example 4

Figure 16:
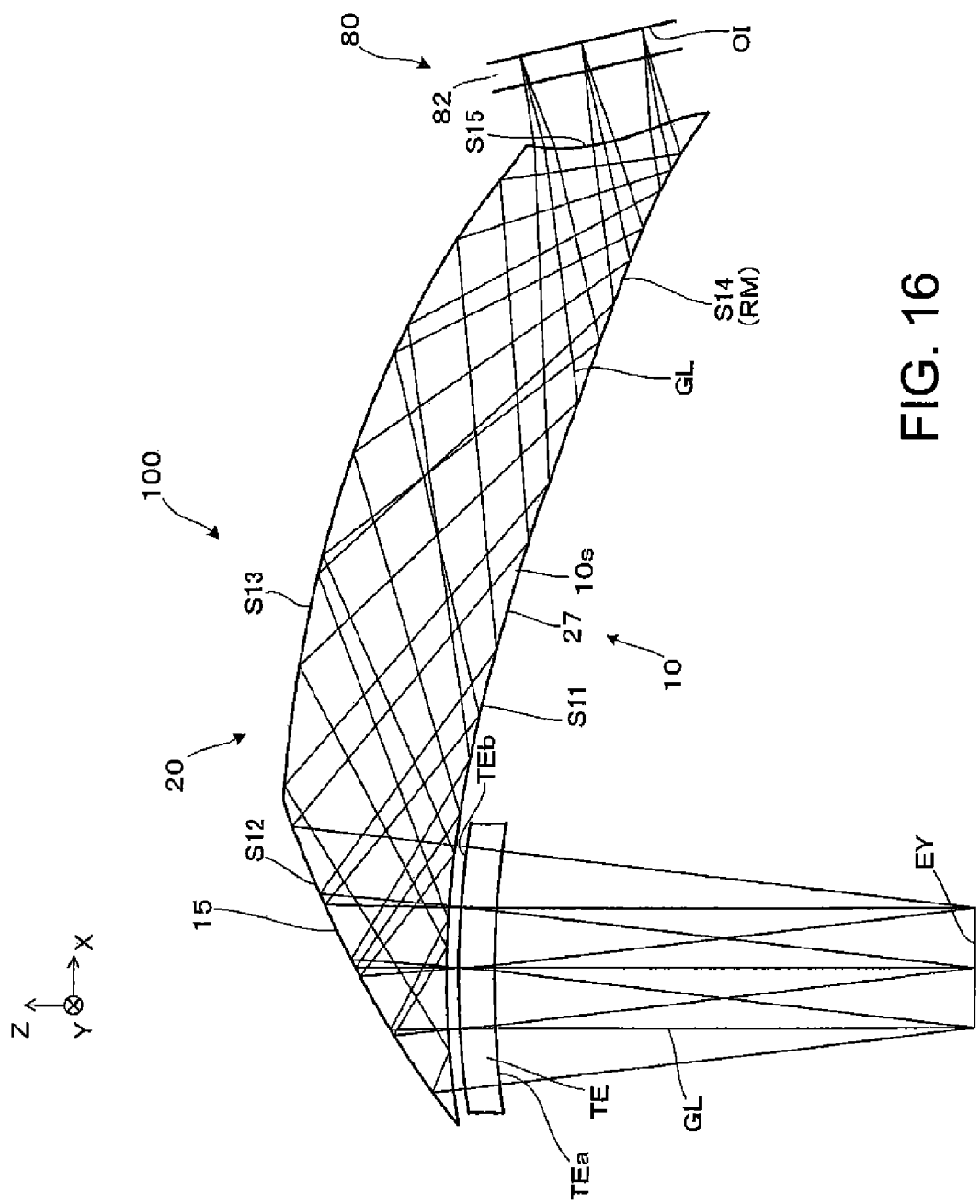
FIG. 16 is a view describing an optical system of Example 4.
Figure 17:
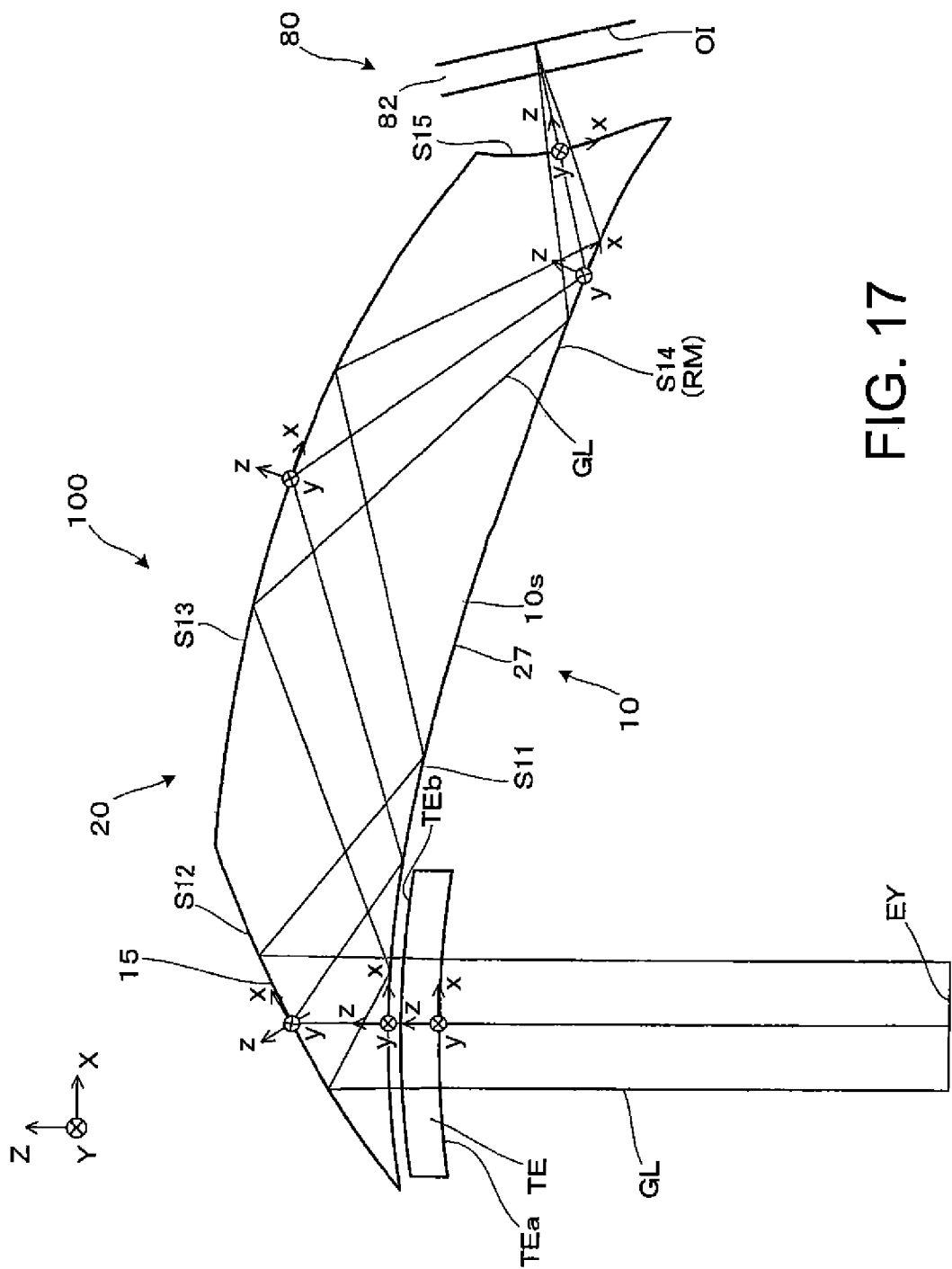
FIG. 17 is a cross-sectional view describing an optical surface and an optical path in a light guide member of Example 4.

Data on the optical surfaces constituting the light guide member of Example 4 are listed in Table 7 below. As illustrated in FIGS. 16 and 17, in the present example, the light guide member 10 includes a fifth surface S15 which is adjacent to the third surface S13 and the fourth surface S14. In addition, the virtual image display apparatus 100 further includes the transmission optical element TE as a light transmissive member provided with the light guide member 10.

TABLE 7

| No | Type  | X      | Y     | Z      | θ      | Nd     | Vd    |
|----|-------|--------|-------|--------|--------|--------|-------|
| 1  | PLANE | 0.000  | 0.000 | 0.000  | 0.00   |        |       |
| 2  | FFS1  | 0.000  | 0.000 | 20.000 | 0.00   | 1.5855 | 29.91 |
| 3  | FFS2  | 0.000  | 0.000 | 21.500 | 0.00   |        |       |
| 4  | FFS2  | 0.000  | 0.000 | 22.000 | 0.00   | 1.525  | 55.95 |
| 5  | FFS3  | 0.000  | 0.000 | 25.800 | 28.00  | 1.525  | 55.95 |
| 6  | FFS2  | 0.000  | 0.000 | 22.000 | 0.00   | 1.525  | 55.95 |
| 7  | FFS4  | 21.362 | 0.000 | 26.102 | −18.96 | 1.525  | 55.95 |
| 8  | FFS5  | 29.399 | 0.000 | 14.639 | −20.96 | 1.525  | 55.95 |
| 9  | FFS6  | 34.270 | 0.000 | 15.767 | −76.96 |        |       |
| 10 | PLANE | 37.318 | 0.000 | 16.472 | −76.96 | 1.458  | 67.82 |
| 11 | IMAGE | 38.487 | 0.000 | 16.743 | −76.96 |        |       |

With regard to each optical surface in the light guide member and the transmission optical element constituting Example 3, the coefficient $Ak_{m,n}$ in the polynomial expression in which a free-form curved surface is expanded is listed in Table 8 below. The coefficient $Ak_{m,n}$ means a coefficient of each term $x^m \cdot y^n$ constituting the polynomial expression representing the k-th surface as a target.

TABLE 8

| m | n | FFS1 | FFS2 | FFS3 | FFS4 | FFS5 | FFS6 |
|---|---|---|---|---|---|---|---|
| 2 | 0 | −1.170E−02 | −1.302E−02 | −1.033E−02 | −1.054E−02 | −7.507E−03 | 4.551E−02 |
| 0 | 2 | −2.250E−02 | −2.192E−02 | −1.180E−02 | −2.080E−02 | −1.402E−02 | 1.605E−03 |
| 3 | 0 | 0.000E+00 | 1.108E−04 | 2.568E−04 | −9.298E−05 | −1.002E−03 | −6.109E−03 |
| 1 | 2 | 0.000E+00 | −9.871E−05 | −3.922E−05 | −1.628E−04 | −7.120E−04 | 2.525E−03 |
| 4 | 0 | 0.000E+00 | 4.175E−06 | −1.032E−05 | −2.784E−06 | −7.865E−05 | 4.648E−04 |
| 2 | 2 | 0.000E+00 | −1.540E−05 | 2.557E−05 | −8.728E−06 | −5.395E−05 | 8.330E−04 |
| 0 | 4 | 0.000E+00 | −2.845E−05 | −1.016E−06 | −1.830E−05 | −3.253E−05 | 3.697E−04 |
| 5 | 0 | 0.000E+00 | −1.687E−07 | 3.900E−07 | −9.354E−08 | −3.546E−06 | 6.913E−05 |
| 3 | 2 | 0.000E+00 | 2.286E−06 | −1.452E−06 | −1.700E−07 | −7.857E−07 | 3.507E−05 |
| 1 | 4 | 0.000E+00 | −2.332E−06 | 6.061E−07 | −6.968E−07 | −6.097E−06 | −9.825E−06 |
| 6 | 0 | 0.000E+00 | 3.262E−09 | 1.670E−08 | −2.880E−09 | −7.746E−08 | −4.944E−05 |
| 4 | 2 | 0.000E+00 | −5.358E−08 | 5.229E−08 | −1.556E−08 | 5.357E−08 | −2.858E−05 |
| 2 | 4 | 0.000E+00 | 1.905E−07 | 1.634E−08 | −2.405E−08 | −3.170E−07 | −1.062E−06 |
| 0 | 6 | 0.000E+00 | 1.404E−07 | 1.241E−08 | 1.609E−09 | 4.253E−08 | −3.972E−06 |

FIG. 16 is a cross-sectional view of the virtual image display apparatus of Example 4. However, in regard to the light flux, only a light flux on the reference surface SR is indicated. Further, FIG. 17 is a view illustrating the local coordinates in the light guide member. In the virtual image display apparatus 100, the light guide member 10 includes the first surface S11 having weak negative refractive power, the second surface S12 having comparatively strong positive refractive power, the third surface S13 having comparatively weak positive refractive power, and the fourth surface S14 having negative refractive power. Further, in the present example, the light guide member 10 further includes the fifth surface S15 which is continuously adjacent to the third surface S13. In addition, as described in the figure, the fifth surface S15 is a light incidence surface. In contrast, the third surface S13 has only a function of bending an optical path. That is, both of the functions of the third surface S13 of Example 1 are shared by the third surface S13 and the fifth surface S15 in Example 4. Further, in the present example, as described above, the virtual image display apparatus 100 further includes the transmission optical element TE between the first surface S11 and the eyes EY as an optical path post stage, that is, a light emission surface of the light guide member 10. When a specific specification of the optical system of Example 4 is described, a horizontal viewing angle is 13.6°, a vertical viewing angle is 24.0°, the size of a display area of the video display element is 5.18×9.22 mm, a pupil diameter is 5.0 mm, and a focal distance is approximately 21.7 mm.

Figure 18A:
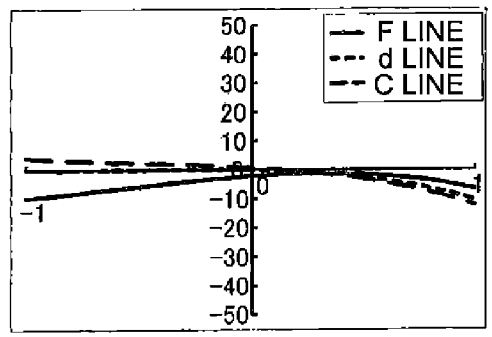
FIGS. 18A to 18F are views describing aberration of the optical system of Example 4.
Figure 18D:
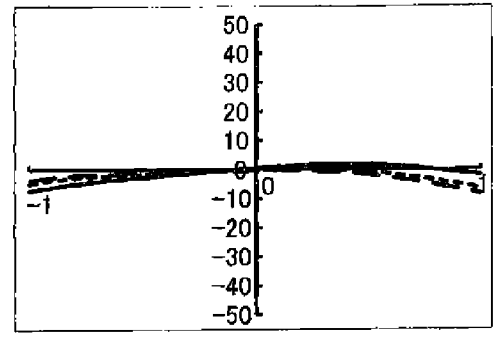
Figure 18B:
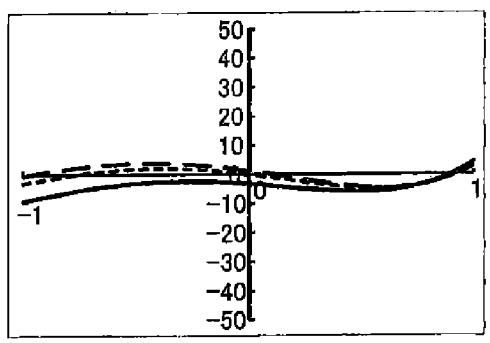
Figure 18E:
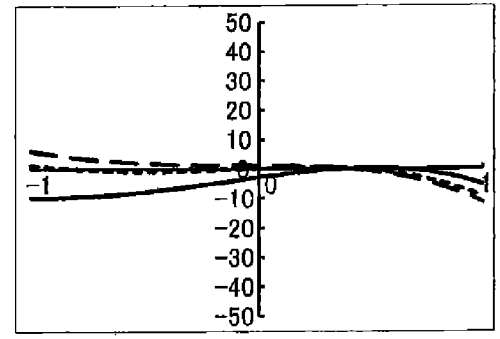
Figure 18C:
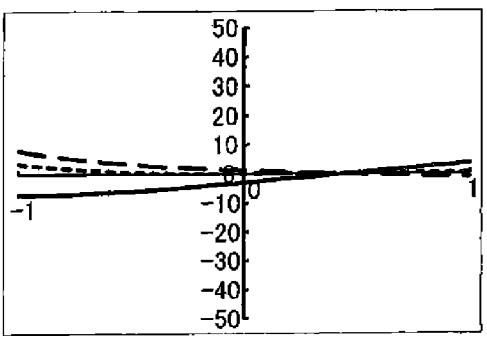
Figure 18F:
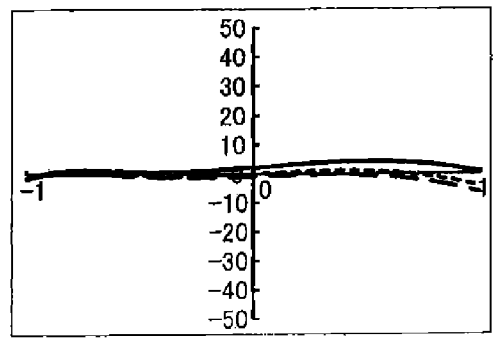
Figure 19A:
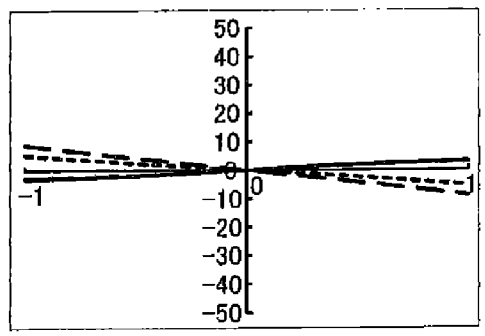
FIGS. 19A to 19F are views describing aberration of the optical system of Example 4.
Figure 19B:
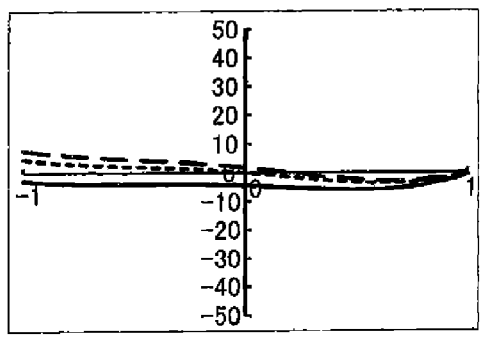
Figure 19C:
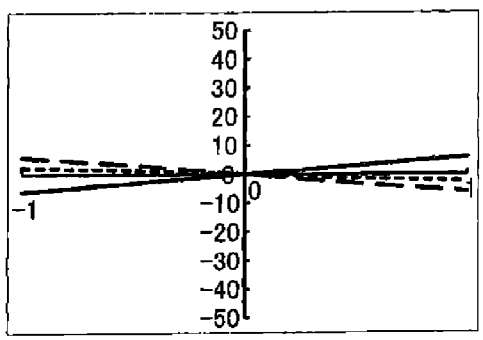
Figure 19D:
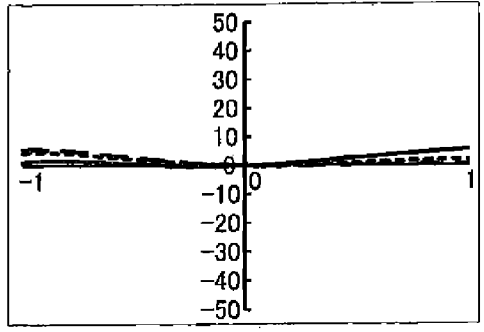
Figure 19E:
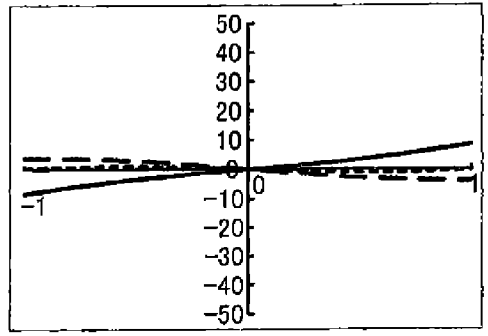
Figure 19F:
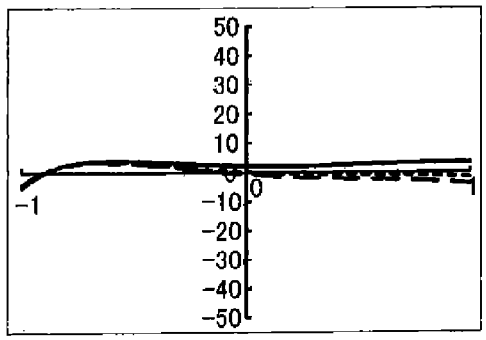

FIGS. 18A to 18F and 19A to 19F show aberration of Example 4. In each aberration diagram, the horizontal axis represents a position in a pupil, and the vertical axis represents the amount of aberration in a unit of microns. Specifically, FIGS. 18A and 18B show aberration in the Y and X directions at an azimuth of 6.82° in the X direction and 12.0° in the Y direction, FIGS. 18C and 18D show aberration in the Y and X directions at an azimuth of 0.0° in the X direction and 12.0° in the Y direction, and FIGS. 18E and 18F show aberration in the Y and X directions at an azimuth of −6.82° in the X direction and 12.0° in the Y direction. FIGS. 19A and 19B show aberration in the Y and X directions at an azimuth of 6.82° in the X direction and 0.0° in the Y direction, FIGS. 19C and 19D show aberration in the Y and X directions at an azimuth of 0.0° in the X direction and 0.0° in the Y direction, and FIGS. 19E and 19F show aberration in the Y and X directions at an azimuth of −6.82° in the X direction and 0.0° in the Y direction. The amount of aberration shown in the figure represents the amount of aberration on the image surface of the video display element when a light beam is reversed for convenience.

In Table 9 below, numerical data on Conditional Expressions (1) and (2) are summarized from values related to the coefficient $Ak_{m,n}$ in Examples 1 to 4. Further, it is understood that Conditional Expression (3) is satisfied from the values related to the coefficient $Ak_{m,n}$.

TABLE 9

| Coefficient value or condition value | | Example 1 | Example 2 | Example 3 | Example 4 |
|---|---|---|---|---|---|
| $A1_{2,0}$ | | −1.216E−02 | −1.166E−02 | −7.396E−03 | −1.302E−02 |
| $A1_{0,2}$ | | −2.154E−02 | −2.246E−02 | −1.944E−02 | −2.192E−02 |
| $A2_{2,0}$ | | −1.545E−02 | −1.040E−02 | −1.201E−02 | −1.033E−02 |
| $A2_{0,2}$ | | −1.801E−02 | −1.212E−02 | −1.829E−02 | −1.180E−02 |
| $A3_{2,0}$ | | −8.157E−03 | −1.025E−02 | −8.162E−03 | −1.054E−02 |
| $A3_{0,2}$ | | −2.031E−02 | −2.117E−02 | −1.772E−02 | −2.080E−02 |
| Conditional Expression (1) | $A1_{2,0} + A1_{0,2}$ | −3.37E−02 | −3.41E−02 | −2.68E−02 | −3.49E−02 |
| Conditional Expression (1) | $A2_{2,0} + A2_{0,2}$ | −3.35E−02 | −2.25E−02 | −3.03E−02 | −2.21E−02 |
| Conditional Expression (1) | $A3_{2,0} + A3_{0,2}$ | −2.85E−02 | −3.14E−02 | −2.59E−02 | −3.13E−02 |
| Conditional Expression (2) | $|A1_{2,0} - A1_{0,2}|$ | 9.38E−03 | 1.08E−02 | 1.20E−02 | 8.90E−03 |
| Conditional Expression (2) | $|A3_{2,0} - A3_{0,2}|$ | 1.22E−02 | 1.09E−02 | 9.56E−03 | 1.03E−02 |

Others

Although the invention has been described on the basis of the above-described embodiment, the invention is not limited to the above-described embodiment, and may be realized in various forms in the range without departing from the spirit of the invention. For example, the following modifications may be made.

In the above description, although the distribution of display luminance in the video display element 82 is not particularly adjusted, when a luminance difference is generated due to the position, or the like, the distribution of display luminance may be adjusted unevenly or the like.

Figure 20:
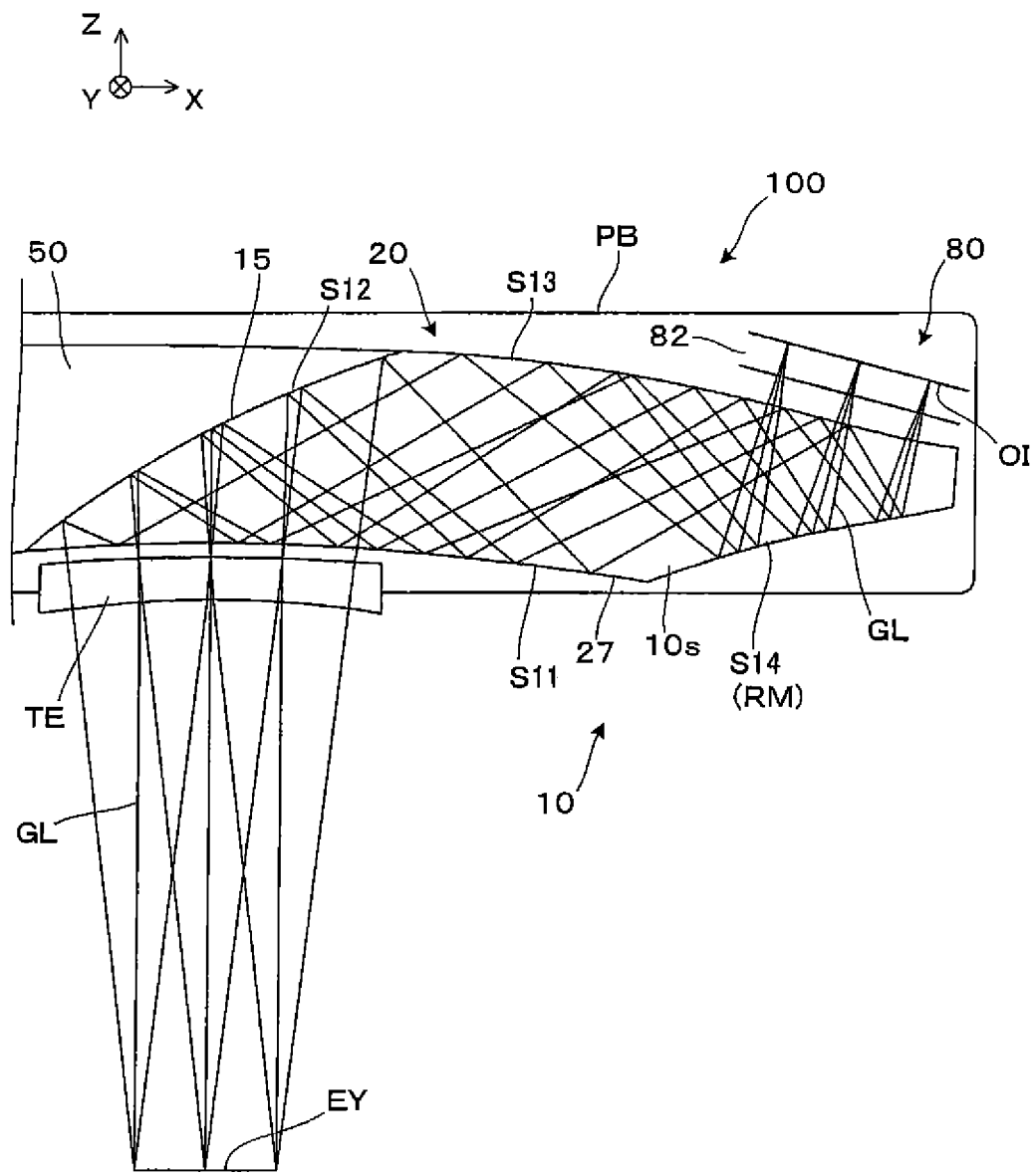
FIG. 20 is a view describing a virtual image display apparatus of a modification example of Example 3.

In the above description, in Examples 3 and 4, the transmission optical element TE arranged on the light emission side of the light guide member 10 is further included, but as a modification example of Example 3 illustrated in FIG. 20, a protection member PB protecting the video display element 82 and the light guide device 20 including the light guide member 10 in a sealing state in cooperation with the transmission optical element TE may be included. In this case, since the light guide device 20 is protected by the protection member PB or the like, the hard coat layer is not necessarily provided, and it is possible that only a surface exposed among the transmission optical elements TE is formed of the hard coat layer and other surfaces are not formed of the hard coat layer among surfaces of respective members contributing to guiding the video light. Further, in a case of the figure, the virtual image display apparatus is a so-called closed type (type which is not a see-through type) apparatus in which external light is shielded by the protection member PB.

In the above description, although the video display element 82 which includes a transmissive liquid crystal display device or the like is used as the image display device 80, the image display device 80 is not limited to the video display element 82 which includes a transmissive liquid crystal device or the like, and various devices may be used. For example, a configuration using a reflective liquid crystal display device may be made, or a digital micro-mirror device or the like may be used instead of the video display element 82 which includes the liquid crystal display device or the like. Further, a self-luminous element represented by an LED array or an OLED (organic EL) may be used as the image display device 80.

In the above-described embodiment, although the image display device 80 which includes a transmissive liquid crystal display device or the like is used, alternatively, a scanning image display device may be used.

Figure 21:
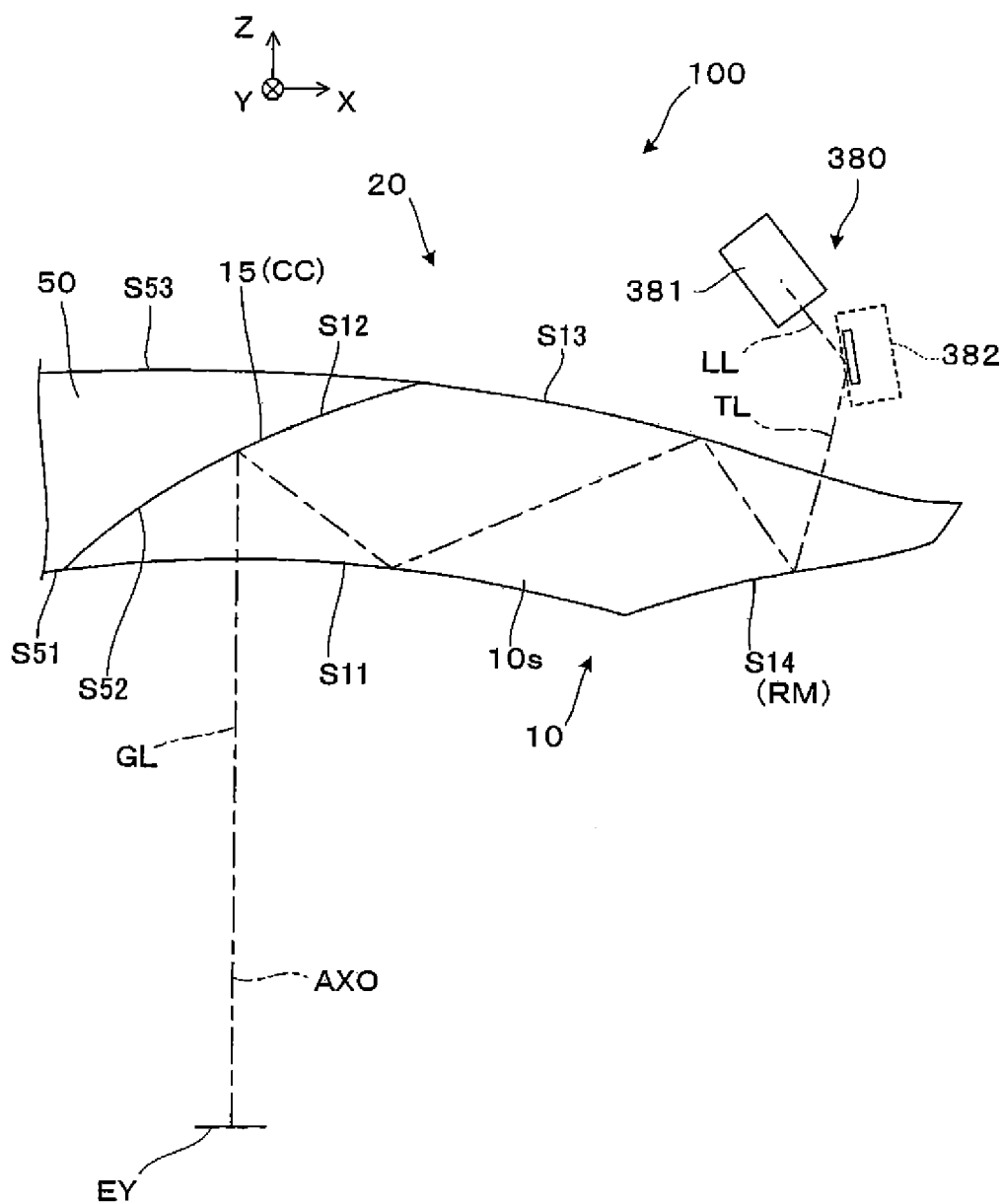
FIG. 21 is a view describing a virtual image display apparatus of a modification example.

Specifically, as illustrated in FIG. 21, the virtual image display apparatus 100 includes the light guide device 20 and the image display device 380. Since the light guide device 20 corresponds to a portion where the light guide member 10 and the light transmission member 50 are bonded, here, the description thereof will be omitted. The image display device 380 is a device which forms signal light subjected to intensity modulation and emits the signal light as scanning light TL, and includes a signal light forming unit 381 and a scanning optical system 382.

The signal light forming unit 381 includes a light source, and emits signal light LL which is modulated and formed based on a control signal from a control circuit (not illustrated). The scanning optical system 382 scans and emits signal light LL passing through the signal light forming unit 381. Here, the scanning optical system 382 includes a MEMS mirror or the like, and performs two-dimensional scanning longitudinally and transversely changing the emission angle of a light beam (scanning light TL) by changing a posture in synchronization with modulation of the signal light LL by using the signal light forming unit 381 to adjust the optical path of signal light LL. With the above, the image display device 380 makes scanning light TL to be video light GL incident on the light guide device 20, and makes scanning light TL scan the entire partial area of the second surface S12 in which the half mirror layer 15 is formed.

An operation of the virtual image display apparatus 100 illustrated in the figure will be described. The image display device 380 emits signal light LL toward the third surface S13 as the light incidence surface of the light guide device 20 as scanning light TL as described above. The light guide device 20 guides scanning light TL passing through the third surface S13 due to total reflection or the like and makes scanning light TL reach the half mirror layer 15. At this time, scanning light TL is scanned on the surface of the half mirror layer 15, whereby a virtual image is formed by video light GL as a trace of scanning light TL. Further, an image is visually recognized by the observer who wears the apparatus capturing the virtual image by the eyes EY.

Figure 22A:
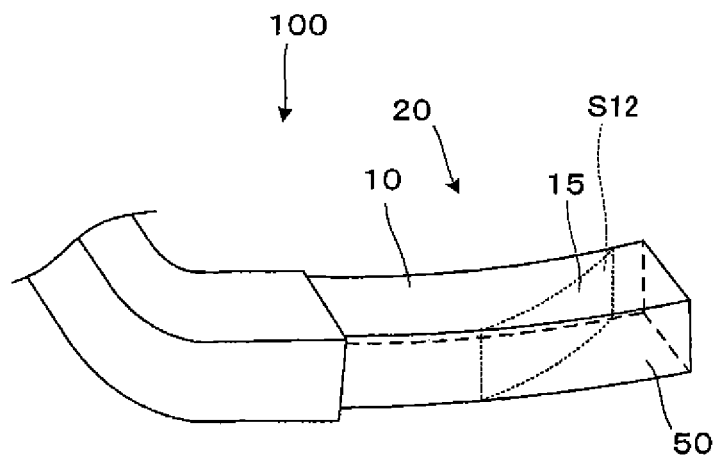
FIG. 22A is a perspective view describing another example of a light guide apparatus and a virtual image display apparatus using the same and FIG. 22B is a front view thereof.
Figure 22B:
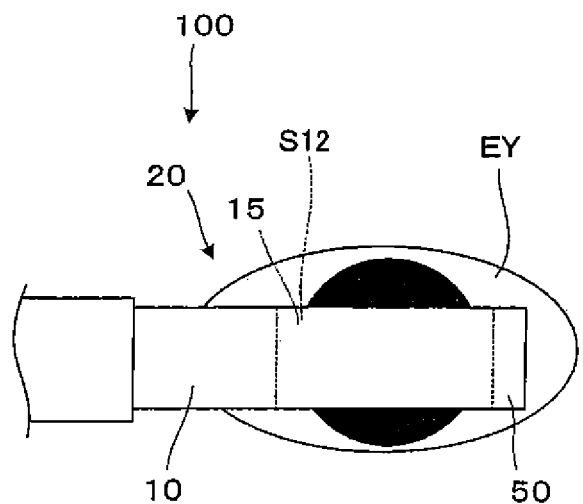

In the foregoing embodiment, although the light guide member 10 and the light transmission member 50 which is the auxiliary optical block are configured to cover the entire front of the eye EY of the person mounting the apparatus, the invention is not limited thereto, and for example, as illustrated in FIGS. 22A and 22B, a small configuration may be made in which a portion including the second surface S12, which is a curved surface shape having the half mirror layer 15, covers only a part of the eyes EY, that is, covers a part of the front of the eye, and an uncovered portion is provided. In this case, even with a configuration in which the light guide member 10 and the light transmission member 50 are sufficiently small and a mirror for total reflection is arranged instead of the half mirror layer 15 without using the see-through manner, a person who mounts the apparatus can observe an external scene in the vicinity of the light guide member 10 and the light transmission member 50. In the case illustrated in the figure, although the half mirror layer 15 is formed on the entire second surface S12 or the substantially entire second surface S12, the half mirror layer 15 may be formed only on a part of the second surface S12. In the example of FIG. 22B, although the half mirror layer 15 is arranged substantially in front of the eyes EY, the half mirror layer 15 may be arranged to be shifted from the front, and the person who mounts the apparatus may move the eyes to visually recognize an image. For example, the position of the eyes EY may be slightly lowered (the positions of the light guide member 10 and the light transmission member 50 are slightly raised). In this case, the lower half of the eyes EY is in a state of being viewed from the bottom of the light guide member 10 and the light transmission member 50.

Figure 23:
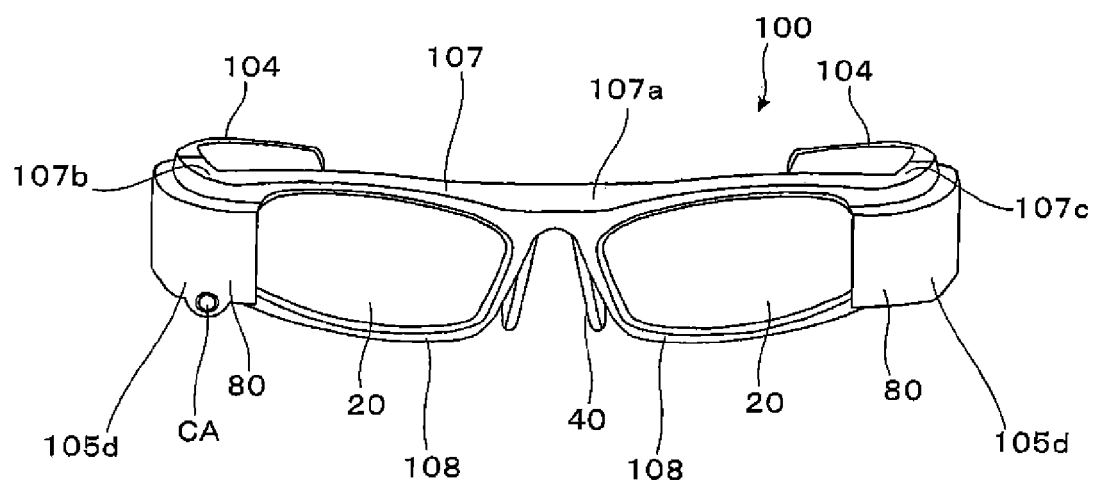
FIG. 23 is a front view illustrating a status of external appearance of still another example of a virtual image display apparatus.

In the above description, an image is viewed using one eye, but a configuration including a display device with a pair of left and right eyes can be provided as illustrated in FIG. 23. That is, pairs of the light guide device 20 and the image display device 80 may be provided in correspondence with both the right eye and the left eye.

In the foregoing description, although the half mirror layer 15 is a simple semitransmissive film (for example, a metal reflection film or a dielectric multilayer film), the half mirror layer 15 can be replaced with a flat or curved hologram element.

In the above description, although video light is totally reflected by an interface with air and guided without providing a mirror, a half mirror, or the like on the first surface S11 and the third surface S13 of the light guide member 10, it is assumed that total reflection in the virtual image display apparatus 100 according to the invention includes reflection by a mirror coating or a half mirror film which is formed on the entirety or a part of the first surface S11 or the third surface S13. For example, total reflection may include a case where, after the incidence angle of image light satisfies the total reflection condition, the mirror coating or the like is formed on the entirety or a part of the first surface S11 or the third surface S13 to reflect substantially entire image light. Furthermore, the entirety or a part of the first surface S11 or the third surface S13 may be coated with a mirror having a slight transmission property insofar as sufficiently bright image light can be obtained.

In the above description, the light guide member 10 or the like extends in the lateral direction parallel to the eyes EY, but the light guide member 10 can be arranged so as to extend in the longitudinal direction. In this case, the light guide member 10 has a configuration with an arrangement not in series but in parallel. Further, in a case illustrated in FIGS. 4A and 4B, a configuration in which a vertically long image is visually recognized is employed, but a configuration in which a horizontally long image is visually recognized using the lateral direction (X direction) as the long side direction of the video display element 82 can be employed. For example, it is considered that visual recognition of the horizontally long image is better for use of displaying video which it is necessary to watch carefully. In a case of visual recognition of the horizontally long image, it is possible to maintain the light guide member 10 to be thin according to demand for miniaturization and to ensure the size of a display screen by adopting the configuration with arrangement in parallel, which means extending in the longitudinal direction.

The entire disclosure of Japanese Patent Application No. 2013-247388, filed Nov. 29, 2013 is expressly incorporated by reference herein.

What is claimed is:

1. A virtual image display apparatus comprising:
a video element which generates video light; and
a light guide member which includes four or more curved surfaces including three or more non-axisymmetric curved surfaces,
wherein the video light emitted from the video element and passing through the light guide member is displayed to an observer on a divergent optical path in an enlarged manner,
the light guide member includes at least three surfaces of a first surface, a second surface, and a third surface as the four or more curved surfaces, reflection of the video light is made four times by four surfaces different from one another in the inside of the light guide member, total reflection is performed on the third surface as a second reflection among the four times of reflections, total reflection is performed on the first surface as a third reflection, reflection is performed on the second surface as the fourth reflection, and the video light reaches the eyes of the observer by being transmitted through the first surface, and
the following condition (1) is satisfied with a coefficient of a term $x^m \cdot y^n$ of a polynomial expression representing a k-th surface as $Ak_{m,n}$, when an expression of a surface shape z is expanded as a polynomial with respect to x and y, by setting origins of respective surfaces constituting the light guide member as references, employing orthogonal coordinates x and y extending in a tangential direction, and setting y as a direction orthogonal to a predetermined symmetric plane:

$$-2 \times 10^1 < A1_{0,2} + A1_{2,0} < -10^{-3}$$

$$-2 \times 10^{-1} < A2_{0,2} + A2_{2,0} < -10^{-3}, \text{ and}$$

$$-2 \times 10^{-1} < A3_{0,2} + A3_{2,0} < -10^{-3} \quad (1).$$

2. The virtual image display apparatus according to claim 1,
wherein the light guide member further includes a fourth surface as the four or more curved surfaces, and
the video light emitted from the video element is incident on the third surface, reflected on the fourth surface, and totally reflected on the third surface.

3. The virtual image display apparatus according to claim 1,
wherein the light guide member further includes fourth and fifth surfaces as the four or more curved surfaces, and
the video light emitted from the video element is incident on the fifth surface, reflected on the fourth surface, and totally reflected on the third surface.

4. The virtual image display apparatus according to claim 1, wherein the following condition (2) is satisfied with respect to the coefficient $Ak_{m,n}$ of the polynomial expression:

$$10^{-3} < |A1_{2,0} - A1_{0,2}| < 10^{-1}, \text{ and}$$

$$10^{-3} < |A3_{2,0} - A3_{0,2}| < 10^{-1} \quad (2).$$

5. The virtual image display apparatus according to claim 1, wherein the following condition (3) is satisfied with respect to the coefficient $Ak_{m,n}$ of the polynomial expression:

$$-10^{-1} < A1_{2,0} < A1_{2,0} < 0, \text{ and}$$

$$-10^{-1} < A3_{2,0} < A3_{2,0} < 0 \quad (3).$$

6. The virtual image display apparatus according to claim 1,
wherein the entire optical system including the video element and the light guide member has a shape of plane-symmetry with respect to a predetermined symmetric plane, and
a long side of the video element is arranged so as to be orthogonal to the symmetric plane.

7. The virtual image display apparatus according to claim 1, further comprising a transmission optical element which is provided with the light guide member, includes at least one aspheric surface, and guides the video light.

8. The virtual image display apparatus according to claim 7,
wherein the transmission optical element further includes a protection member which is arranged on the light emitting side of the light guide member and protects the video element and the light guide member in a sealing state in cooperation with the transmission optical element.

9. The virtual image display apparatus according to claim 1,
wherein a half mirror is formed on the second surface, video light is presented to the observer, a light transmission member is integrally arranged on the outside of the second surface, a diopter to external light is set to substantially 0, and external light and video light are presented to the observer in an overlapping manner.

10. The virtual image display apparatus according to claim 1, wherein the optical system including the light guide member covers a part in front of the eyes of the observer when worn, and a portion where the front of the eyes is not covered is provided.

11. The virtual image display apparatus according to claim 1,
wherein the video element includes a signal light forming portion which emits signal light modulated corresponding to an image, and a scanning optical system which scans the signal light incident from the signal light forming portion to emit signal light as scanning light.

12. A virtual image display apparatus comprising:
a video element which generates video light; and
a light guide member which includes four or more curved surfaces including three or more non-axisymmetric curved surfaces,
wherein the video light emitted from the video element and passing through the light guide member is displayed to an observer on a divergent optical path in an enlarged manner,
the light guide member includes at least three surfaces of a first surface, a second surface, and a third surface as the four or more curved surfaces, reflection of the video light is made four times by four surfaces different from one another in the inside of the light guide member, total reflection is performed on the third surface as a second reflection among the four times of reflections, total reflection is performed on the first surface as a third reflection, reflection is performed on the second surface as the fourth reflection, and the video light reaches the eyes of the observer by being transmitted through the first surface, and
a half mirror is formed on the second surface, video light is presented to the observer, a light transmission member is integrally arranged on the outside of the second surface, a diopter to external light is set to substantially 0, and external light and video light are presented to the observer in an overlapping manner.

13. The virtual image display apparatus according to claim 12,
wherein the light guide member further includes a fourth surface as the four or more curved surfaces, and
the video light emitted from the video element is incident on the third surface, reflected on the fourth surface, and totally reflected on the third surface.

14. The virtual image display apparatus according to claim 12,
wherein the light guide member further includes fourth and fifth surfaces as the four or more curved surfaces, and
the video light emitted from the video element is incident on the fifth surface, reflected on the fourth surface, and totally reflected on the third surface.

15. The virtual image display apparatus according to claim 12,
wherein the entire optical system including the video element and the light guide member has a shape of plane-symmetry with respect to a predetermined symmetric plane, and
a long side of the video element is arranged so as to be orthogonal to the symmetric plane.

16. The virtual image display apparatus according to claim 12, further comprising a transmission optical element which is provided with the light guide member, includes at least one aspheric surface, and guides the video light.

17. The virtual image display apparatus according to claim 16,
wherein the transmission optical element further includes a protection member which is arranged on the light emitting side of the light guide member and protects the video element and the light guide member in a sealing state in cooperation with the transmission optical element.

18. The virtual image display apparatus according to claim 12,
wherein the optical system including the light guide member covers a part in front of the eyes of the observer when worn, and a portion where the front of the eyes is not covered is provided.

19. The virtual image display apparatus according to claim 12,
wherein the video element includes a signal light forming portion which emits signal light modulated corresponding to an image, and a scanning optical system which scans the signal light incident from the signal light forming portion to emit signal light as scanning light.

20. The virtual image display apparatus according to claim 12, wherein:
the following condition (1) is satisfied with a coefficient of a term $x^m \cdot y^n$ of a polynomial expression representing a k-th surface as $Ak_{m,n}$, when an expression of a surface shape z is expanded as a polynomial with respect to x and y, by setting origins of respective surfaces constituting the light guide member as references, employing orthogonal coordinates x and y extending in a tangential direction, and setting y as a direction orthogonal to a predetermined symmetric plane:

$$-2 \times 10^1 < A1_{0,2} + A1_{2,0} < -10^3,$$

$$-2 \times 10^{-1} < A2_{0,2} + A2_{2,0} < -10^{-3}, \text{ and}$$

$$-2 \times 10^{-1} < A3_{0,2} + A3_{20} < -10^{-3} \qquad (1);$$

(ii) the following condition (2) is satisfied with respect to the coefficient $Ak_{m,n}$ of the polynomial expression:

$$10^{-3} < |A1_{2,0} - A1_{0,2}| < 10^{-1}, \text{ and}$$

$$10^{-3} < |A3_{2,0} - A3_{0,2}| < 10^{-1} \qquad (2); \text{ and}$$

(iii) the following condition (3) is satisfied with respect to the coefficient $Ak_{m,n}$ of the polynomial expression:

$$-10^{-1} < A1_{2,0} < A1_{2,0} < 0, \text{ and}$$

$$-10^{-1} < A3_{2,0} < A3_{2,0} < 0 \qquad (3).$$

* * * * *